US012777270B2

(12) United States Patent
Goden et al.

(10) Patent No.: US 12,777,270 B2
(45) Date of Patent: Oct. 27, 2026

(54) IMAGING DEVICE AND METHOD OF DRIVING IMAGING DEVICE

(71) Applicant: CANON KABUSHIKI KAISHA, Tokyo (JP)

(72) Inventors: Tatsuhito Goden, Tokyo (JP); Takanori Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/021,976

(22) Filed: Jan. 15, 2025

(65) Prior Publication Data

US 2025/0254447 A1 Aug. 7, 2025

(30) Foreign Application Priority Data

Feb. 7, 2024 (JP) ................................ 2024-016925

(51) Int. Cl.

| | |
|---|---|
| ***H04N 25/78*** | (2023.01) |
| ***H04N 25/42*** | (2023.01) |
| ***H04N 25/65*** | (2023.01) |
| ***H04N 25/67*** | (2023.01) |
| ***H04N 25/76*** | (2023.01) |

(52) U.S. Cl.

CPC ............. *H04N 25/78* (2023.01); *H04N 25/42* (2023.01); *H04N 25/65* (2023.01); *H04N 25/67* (2023.01); *H04N 25/7795* (2023.01)

(58) Field of Classification Search

CPC ........ H04N 25/78; H04N 25/25; H04N 25/42; H04N 25/7795; H04N 25/67

See application file for complete search history.

(56) References Cited

U.S. PATENT DOCUMENTS

| | | | | |
|---|---|---|---|---|
| 6,553,151 B1 * | 4/2003 | Gahang | H04N 1/401 358/461 |
| 7,920,192 B2 | 4/2011 | Watanabe | |
| 8,411,187 B2 | 4/2013 | Watanabe | |
| 8,466,532 B2 | 6/2013 | Watanabe | |
| 8,648,949 B2 | 2/2014 | Watanabe | |

(Continued)

FOREIGN PATENT DOCUMENTS

| | | |
|---|---|---|
| JP | 2005-333316 A | 12/2005 |
| JP | 2006-157149 A | 6/2006 |
| JP | 2011-250188 A | 12/2011 |

*Primary Examiner* — Thai Q Tran
*Assistant Examiner* — Jose M Mesa
(74) *Attorney, Agent, or Firm* — VENABLE LLP

(57) ABSTRACT

In an imaging device, in a first mode, an analog-to-digital conversion unit performs analog-to-digital conversion on pixel signals from a first output line and a second output line to generate first pixel data and second pixel data, respectively, a first memory stores the first pixel data, a second memory stores the second pixel data, and the scanning circuit causes the first memory to output the first pixel data and causes the second memory to output the second pixel data. In a second mode, the analog-to-digital conversion unit performs analog-to-digital conversion on pixel signals from the first output line and the second output line to generate third pixel data and fourth pixel data, respectively, the first memory stores the third pixel data and the fourth pixel data, and the scanning circuit causes the first memory to output the third pixel data and the fourth pixel data.

20 Claims, 17 Drawing Sheets

(56) References Cited

U.S. PATENT DOCUMENTS

| | | | | |
|---|---|---|---|---|
| 8,841,713 | B2 | 9/2014 | Watanabe | |
| 9,024,363 | B2 | 5/2015 | Watanabe | |
| 9,391,108 | B2 | 7/2016 | Watanabe | |
| 9,445,023 | B2 | 9/2016 | Kuroda | |
| 9,762,837 | B2 | 9/2017 | Kuroda | |
| 9,769,411 | B2 * | 9/2017 | Nitta | H04N 23/54 |
| 9,774,810 | B2 | 9/2017 | Tashiro | |
| 9,825,077 | B2 | 11/2017 | Watanabe | |
| 9,991,305 | B2 | 6/2018 | Goden | |
| 10,297,633 | B2 | 5/2019 | Suzuki | |
| 10,404,932 | B2 | 9/2019 | Kuroda | |
| 10,652,496 | B2 | 5/2020 | Goden | |
| 10,819,931 | B2 | 10/2020 | Goden | |
| 11,169,022 | B2 | 11/2021 | Goden | |
| 11,425,365 | B2 | 8/2022 | Ishii | |
| 11,532,660 | B2 | 12/2022 | Kato | |
| 11,631,712 | B2 | 4/2023 | Goden | |
| 2002/0075252 | A1 * | 6/2002 | Lee | G09G 3/3659 345/211 |
| 2004/0021788 | A1 * | 2/2004 | Shizukuishi | H04N 25/78 348/E3.018 |
| 2006/0132622 | A1 | 6/2006 | Ikeyama | |
| 2010/0134171 | A1 * | 6/2010 | Yoshida | H03K 5/1515 327/295 |
| 2022/0030164 | A1 * | 1/2022 | Kobayashi | G06T 7/50 |
| 2024/0055464 | A1 * | 2/2024 | García González | A61B 6/4233 |

* cited by examiner

IMAGING DEVICE AND METHOD OF DRIVING IMAGING DEVICE

BACKGROUND

Technical Field

The present disclosure relates to an imaging device and a method of driving the imaging device.

Description of the Related Art

Japanese Patent Application Laid-Open No. 2005-333316 proposes an imaging device capable of appropriately selecting a frame reading speed and a fineness of gradation according to an application or situation. The imaging device includes a plurality of pixels that convert an amount of incident light into an analog electrical signal, an analog-to-digital conversion circuit (ADC) that converts an analog signal from the pixel into a digital signal, and an output control circuit that outputs the digital signal converted by the ADC to an output line. The ADC is configured to be capable of switching the number of bits of the converted digital signal between at least two predetermined numbers of bits.

In an imaging device in which the number of bits of a digital signal to be output can be switched as disclosed in Japanese Patent Application Laid-Open No. 2005-333316, further speeding up of the operation may be required.

SUMMARY

According to the present disclosure, it is possible to provide an imaging device and a method of driving the imaging device capable of high-speed operation.

According to a disclosure of the present specification, there is provided an imaging device including a plurality of pixels each configured to output a pixel signal, a first output line and a second output line each connected to a corresponding pixel, an analog-to-digital conversion unit configured to perform analog-to-digital conversion on the pixel signal to generate pixel data, a first memory and a second memory each configured to hold the pixel data, and a scanning circuit configured to perform scanning for causing the first memory and the second memory to output the pixel data. In a first mode, the analog-to-digital conversion unit performs analog-to-digital conversion on a pixel signal from the first output line to generate first pixel data and performs analog-to-digital conversion on a pixel signal from the second output line to generate second pixel data, the first memory stores the first pixel data, the second memory stores the second pixel data, and the scanning circuit causes the first memory to output the first pixel data and causes the second memory to output the second pixel data. In a second mode, the analog-to-digital conversion unit performs analog-to-digital conversion on a pixel signal from the first output line to generate third pixel data and performs analog-to-digital conversion on a pixel signal from the second output line to generate fourth pixel data, the first memory stores the third pixel data and the fourth pixel data, and the scanning circuit causes the first memory to output the third pixel data and the fourth pixel data.

According to a disclosure of the present specification, there is provided a method of driving imaging device including a plurality of pixels each configured to output a pixel signal, a first output line and a second output line each connected to a corresponding pixel, and a first memory and a second memory each configured to hold pixel data generated by analog-to-digital conversion on the pixel signal. The method includes, in a first mode, generating first pixel data by performing analog-to-digital conversion on a pixel signal from the first output line to store the first pixel data in the first memory and generating second pixel data by performing analog-to-digital conversion on a pixel signal from the second output line to store the second pixel data in the second memory, and outputting the first pixel data from the first memory and outputting the second pixel data from the second memory. The method includes, in a second mode, generating third pixel data by performing analog-to-digital conversion on a pixel signal from the first output line to store the third pixel data in the first memory and generating fourth pixel data by performing analog-to-digital conversion on a pixel signal from the second output line to store the fourth pixel data in the first memory, and outputting the third pixel data and the fourth pixel data from the first memory.

Further features of the present invention will become apparent from the following description of exemplary embodiments with reference to the attached drawings.

DESCRIPTION OF THE EMBODIMENTS

Figure 1:
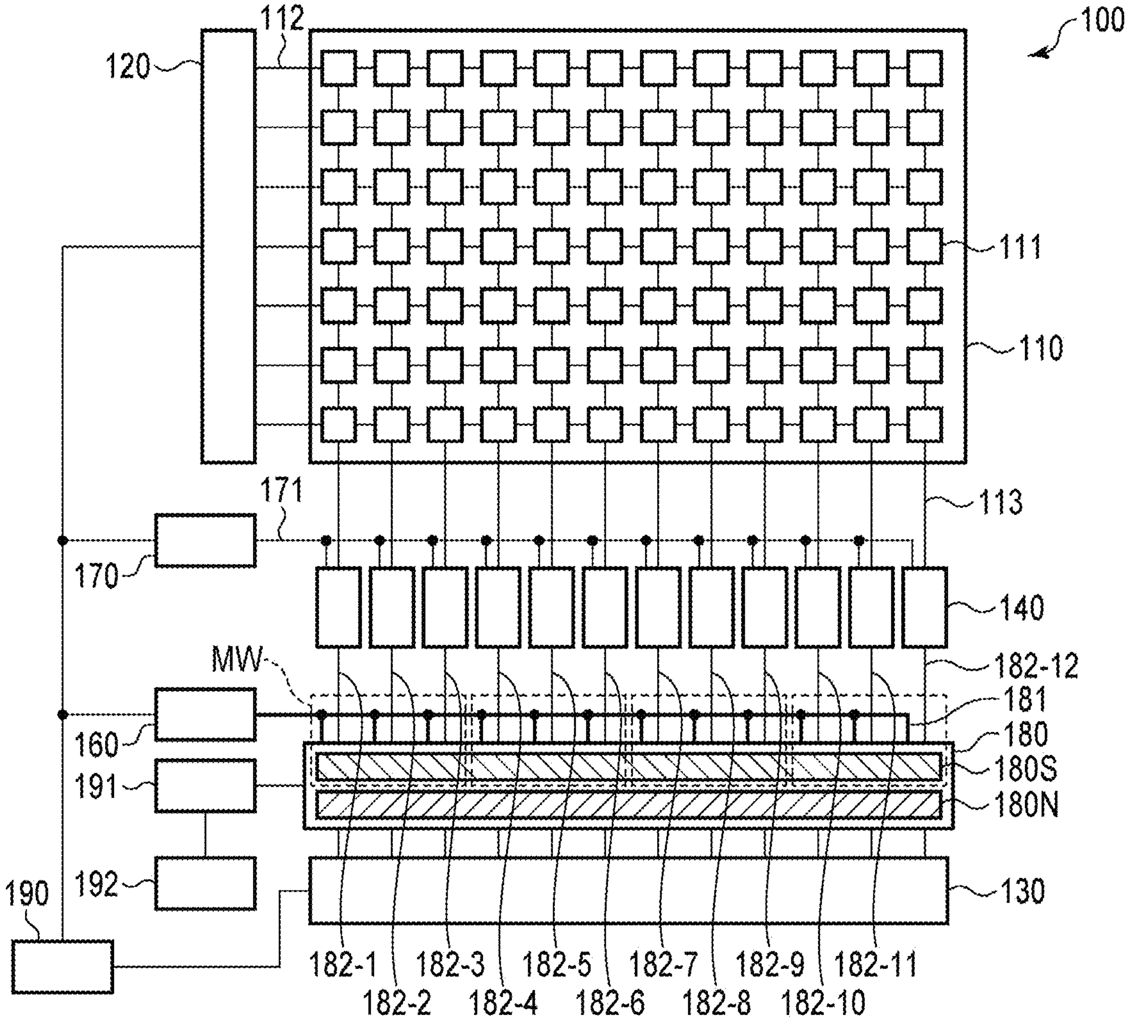
FIG. 1 is a block diagram schematically illustrating an overall configuration of an imaging device according to a first embodiment.

Hereinafter, embodiments of the present invention will be described with reference to the drawings. The same or corresponding elements are denoted by the same reference numerals throughout the several drawings, and the description thereof may be omitted or simplified.

First Embodiment

An imaging device 100 according to the first embodiment will be described with reference to FIGS. 1 to 8B. FIG. 1 is a block diagram schematically illustrating an overall configuration of the imaging device 100 according to the present embodiment. The imaging device 100 includes a pixel array 110, a vertical scanning circuit 120, a horizontal scanning circuit 130, signal processing circuits 140, a counter 160, a reference signal generation circuit 170, a memory group 180, a timing control unit 190, an arithmetic processing circuit 191, and an output unit 192. The imaging device 100 also includes row control lines 112, output lines 113, a reference signal line 171, a count signal line 181, and latch pulse signal lines 182-1 to 182-12. Note that the suffix "−1" to "−12" of the reference numeral indicates column numbers.

A plurality of pixels 111 are arranged in the pixel array 110. The pixel 111 outputs a pixel signal based on charges generated by photoelectrically converting incident light. The plurality of pixels 111 are arranged to form a plurality of rows and a plurality of columns. Although FIG. 1 exemplifies the pixels 111 of seven rows and twelve columns in order to simplify the description, the number of rows and the number of columns of the pixels 111 are not limited thereto.

In the following description, the pixel 111 is assumed to be a pixel that detects light by a photoelectric conversion element unless otherwise specified, but the configuration of the pixel 111 is not limited thereto. For example, the pixel 111 may be a radiation detection element having sensitivity to radiation such as alpha rays, beta rays, gamma rays, and X-rays. The radiation detection element may include, for example, a scintillator that converts radiation into light and a photoelectric conversion element that detects the converted light. That is, the imaging device 100 may be a radiation imaging device. In this case, "light" in the following description can be appropriately read as "radiation".

The plurality of output lines 113 are provided corresponding to the plurality of pixel columns, respectively. Pixel signals from the pixels 111 in the corresponding columns are output to each of the plurality of output lines 113. Examples of the type of the pixel signal include a light signal output from the pixel 111 based on charges generated by photoelectric conversion and a noise signal output from the pixel 111 in a reset state. In addition, the correspondence relationship between the pixels 111 and the output lines 113 may be a configuration in which one output line 113 is arranged corresponding to one column as illustrated in FIG. 1, but is not limited thereto. For example, a plurality of output lines 113 may be arranged corresponding to one column, and in this case, since the number of pixels 111 read at one time can be increased, the frame reading speed can be improved.

The vertical scanning circuit 120 is electrically connected to the plurality of pixels 111 via the plurality of row control lines 112. One row control line 112 is arranged in common to a plurality of pixels 111 in one corresponding row. The vertical scanning circuit 120 supplies control signals to the plurality of row control lines 112 based on the control signal supplied from the timing control unit 190. When the control signal supplied to the row control line 112 becomes an active state, the pixels 111 connected to the row control line 112 output pixel signals to the corresponding output lines 113. When the vertical scanning circuit 120 sequentially activates the control signals of the plurality of row control lines 112, the pixel signals from the plurality of pixels 111 are sequentially output to the output lines 113. The vertical scanning circuit 120 may include a shift register or an address decoder.

The reference signal generation circuit 170 generates a ramp signal. The ramp signal is a reference signal having a signal level that monotonically changes over time. The reference signal generation circuit 170 supplies a ramp signal to each of the plurality of signal processing circuits 140 via the reference signal line 171. The reference signal generation circuit 170 starts changing the signal level of the ramp signal based on the control signal supplied from the timing control unit 190.

Each of the plurality of signal processing circuits 140 is electrically connected to a corresponding one of the plurality of output lines 113. That is, one signal processing circuit 140 is configured to process a pixel signal output from at least one pixel 111. The processing performed by the signal processing circuit 140 includes analog-to-digital conversion (hereinafter, referred to as AD conversion) on the pixel signal.

Output nodes of the plurality of signal processing circuits 140 are electrically connected to the memory group 180 via corresponding latch pulse signal lines 182-1 to 182-12. Each of the plurality of signal processing circuits 140 supplies a latch pulse signal to the memory group 180 via a corresponding one of the latch pulse signal lines 182-1 to 182-12. As described later, the signal processing circuit 140 outputs a latch pulse signal based on the result of comparison between the pixel signal from the pixel 111 and the ramp signal. The latch pulse signal has a predetermined pulse width. In other words, the latch pulse signal is activated for a predetermined period of time. The signal levels of the active state and the inactive state of the latch pulse signal are appropriately set according to the circuit in the subsequent stage.

The memory group 180 includes an S-memory group 180S (first memory area) and an N-memory group 180N (second memory area). The S-memory group 180S stores S-signals (light data) generated by performing AD conversion on light signals. In FIG. 1, a writing unit MW indicated by a broken-line rectangle is a portion for writing S-signals to the S-memory group 180S. The N-memory group 180N stores N-signals (noise data) generated by performing AD conversion on noise signals. Although details will be described later, the S-memory group 180S includes a plurality of S-memories respectively corresponding to the plurality of signal processing circuits 140. The N-memory group 180N includes a plurality of N-memories respectively corresponding to the plurality of signal processing circuits 140.

The counter 160 supplies a count signal to each of a plurality of memories included in the memory group 180 via the count signal line 181. The counter 160 outputs a count signal by counting pulses of the clock signal supplied from the timing control unit 190. The count signal line 181 includes bus wirings of a plurality of bits. In the present embodiment, the count signal line 181 includes a 12-bit bus wiring.

In the imaging device 100 of the present embodiment, the reference signal generation circuit 170, the signal processing circuit 140, and the counter 160 function as an AD conversion unit (analog-digital conversion unit).

Although the imaging device 100 according to the present embodiment includes one counter 160 and a memory group 180 including a plurality of memories, the number of counters 160 and the number of memories are not particularly limited. For example, the imaging device 100 may include a plurality of counters. In this modification, each of the plurality of counters is electrically connected to a corresponding one of the plurality of signal processing circuits 140. Each of the plurality of counters starts or stops counting according to the latch pulse signal output from the signal processing circuit 140.

The horizontal scanning circuit 130 sequentially scans the plurality of memories included in the memory group 180, and sequentially transfers the plurality of S-signals and the plurality of N-signals held in the memory group 180 to the arithmetic processing circuit 191. The horizontal scanning circuit 130 may include a shift register or an address decoder.

The arithmetic processing circuit 191 performs noise correction to generate a difference signal between the S-signal and the N-signal. This makes it possible to correct noise such as fixed pattern noise. The arithmetic processing circuit 191 may further perform processing such as multiplication of gains and addition of offsets. The arithmetic processing circuit 191 outputs the processed signal to the output unit 192. The output unit 192 is an interface that outputs signals obtained by these processes to the outside of the imaging device 100.

Figure 2:
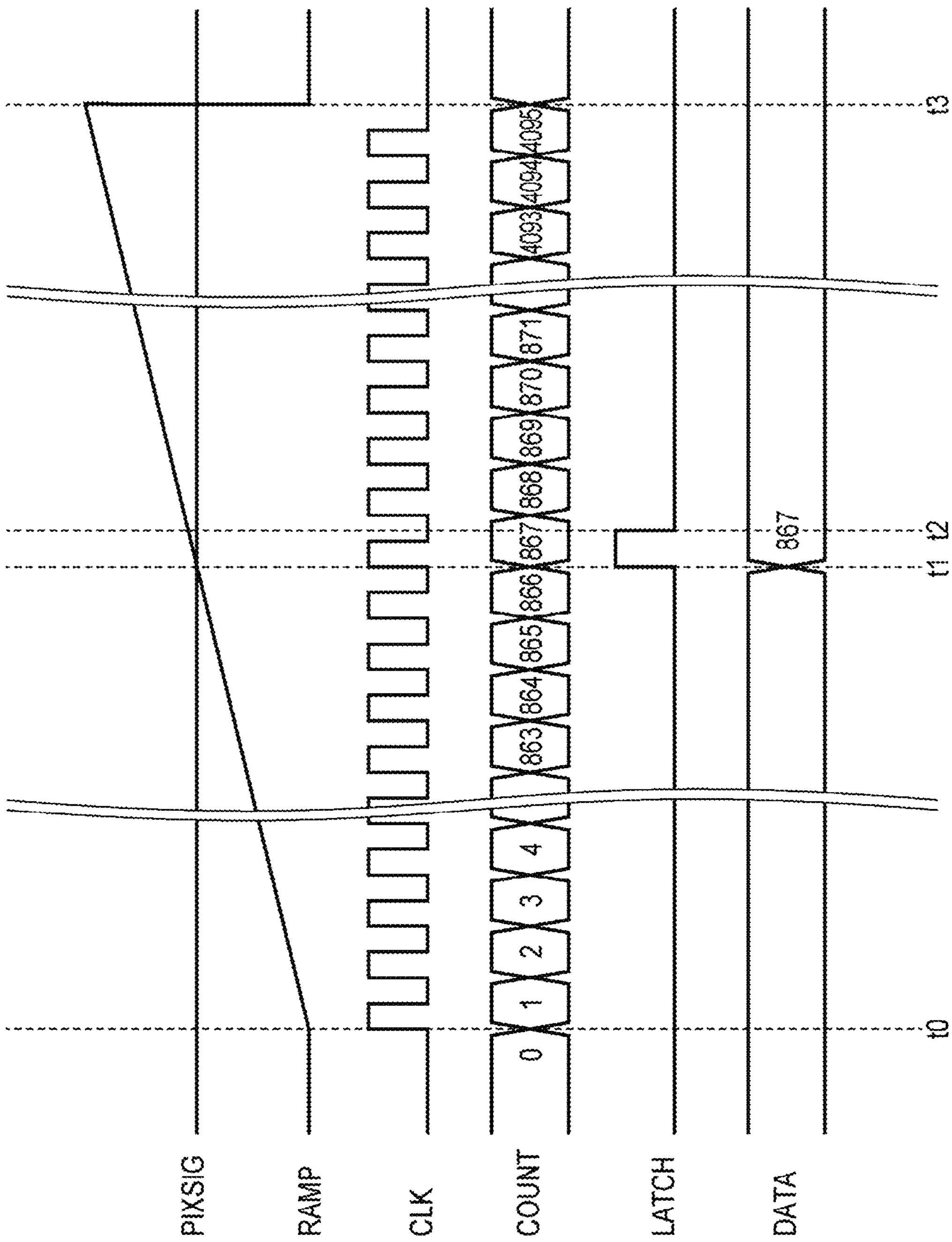
FIG. 2 is a timing chart illustrating an example of an operation of the imaging device according to the first embodiment.

Next, an operation of the AD conversion unit in the imaging device 100 of FIG. 1 will be described with reference to FIG. 2. FIG. 2 is a timing chart of each signal when the AD conversion unit converts a pixel signal PIXSIG into a digital signal. FIG. 2 illustrates signal levels of a ramp signal RAMP and the pixel signal PIXSIG. FIG. 2 illustrates timings of the pulses of a clock signal CLK and a latch pulse signal LATCH. FIG. 2 illustrates values of a count signal COUNT and a value of a 12-bit digital signal DATA held in the memory group 180.

In order to simplify the illustration, the values of the count signal COUNT and the digital signal DATA are described in decimal numbers in FIG. 2. However, these signals may actually be represented by 12-bit Gray codes.

First, at time t0, the AD conversion operation is started. At the time t0, the pixel 111 outputs the pixel signal PIXSIG to the output line 113. At the time t0, the reference signal generation circuit 170 starts changing the signal level of the ramp signal RAMP based on the control signal supplied from the timing control unit 190. After the time t0, the signal level of the ramp signal RAMP rises with time. At the time t0, the counter 160 starts counting the pulses of the clock signal CLK. As a result, the value of the count signal COUNT changes from "0" to "1" at the time t0. Thereafter, the value of the count signal COUNT increases by one every time the pulse of the clock signal CLK rises. At the time t0, the signal level of the pixel signal PIXSIG is higher than the signal level of the ramp signal RAMP.

At time t1, the relationship between the signal level of the pixel signal PIXSIG and the signal level of the ramp signal RAMP is reversed, and the signal level of the ramp signal RAMP becomes higher than the signal level of the signal PIXSIG. Accordingly, the signal processing circuit 140 transitions the latch pulse signal LATCH from the inactive state to the active state. In the present embodiment, the inactive state is the low level, and the active state is the high level. At time t2 when a predetermined time elapses from the time t1, the signal processing circuit 140 transitions the latch pulse signal LATCH from the active state to the inactive state. As described above, the signal level of the latch pulse signal LATCH changes according to the result of the comparison performed by the signal processing circuit 140.

When the latch pulse signal LATCH is in the active state, the memory group 180 receives the count signal COUNT supplied to the memory group 180 at that time. Therefore, at the time t2 when the signal level of the latch pulse signal LATCH changes from the active state to the inactive state, the memory group 180 holds the count signal COUNT supplied to the memory group 180 at that time. As a result, the memory group 180 holds, as the digital signal DATA, the count value corresponding to a length of a period from the time t0 when the signal level of the ramp signal RAMP starts to change to the time t2 when the signal level of the latch pulse signal LATCH transitions to the inactive state. FIG. 2 illustrates an example in which the value of the digital signal DATA is "867" because the value of the count signal COUNT at the time t2 is "867". The digital signal DATA is pixel data obtained by AD conversion of the pixel signal PIXSIG.

At time t3, the reference signal generation circuit 170 ends the change of the signal level of the ramp signal RAMP according to time. Thereafter, the horizontal scanning circuit 130 sequentially scans the plurality of memories of the memory group 180, and sequentially transfers the digital signals DATA held in the memory group 180 to the arithmetic processing circuit 191.

Figure 3:
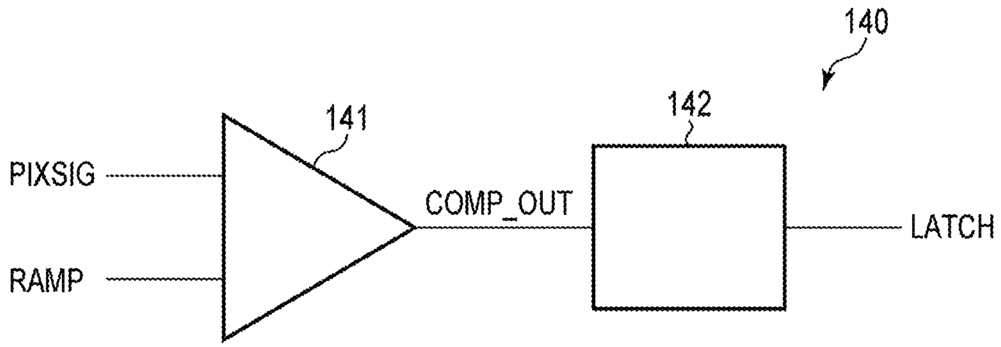
FIG. 3 is a circuit diagram illustrating an example of an equivalent circuit of a signal processing circuit according to the first embodiment.

Next, the configuration of the signal processing circuit 140 will be described. The signal processing circuit 140 according to the present embodiment is a circuit that performs a part of the AD conversion processing. FIG. 3 is a circuit diagram illustrating an example of an equivalent circuit of the signal processing circuit 140. The signal processing circuit 140 includes a comparator 141 and a pulse generation circuit 142. The pulse generation circuit 142 may include a logic circuit such as an AND circuit, a NAND circuit, a NOR circuit, or a latch circuit.

The pixel signal PIXSIG and the ramp signal RAMP illustrated in FIG. 2 are input to the comparator 141. The comparator 141 outputs an output signal COMP_OUT to the pulse generation circuit 142 based on the result of comparison between the pixel signal PIXSIG and the ramp signal RAMP. The pulse generation circuit 142 outputs the latch pulse signal LATCH having a predetermined pulse width based on the output signal COMP_OUT. The latch pulse signal LATCH is output to each of the latch pulse signal lines 182-1 to 182-12. When the signal level of the ramp signal RAMP becomes higher than the signal level of the pixel signal PIXSIG, the latch pulse signal LATCH transitions from the inactive state to the active state. After a predetermined period of time elapses, the latch pulse signal LATCH becomes the inactive state again. In this way, the pulse generation circuit 142 generates the pulse of the latch pulse signal LATCH.

Next, a method of storing data in the memory group 180 according to the present embodiment will be described. The imaging device 100 according to the present embodiment can operate in a first mode and can operate in a second mode in which the number of bits of pixel data is reduced with respect to the first mode. In the present embodiment, it is assumed that the number of bits of pixel data in the first mode is 12 bits, and the number of bits of pixel data in the second mode is four bits. In the present embodiment, the method of storing data in the S-memory group 180S in the memory group 180 is different between the first mode and the second mode.

Figure 4A:
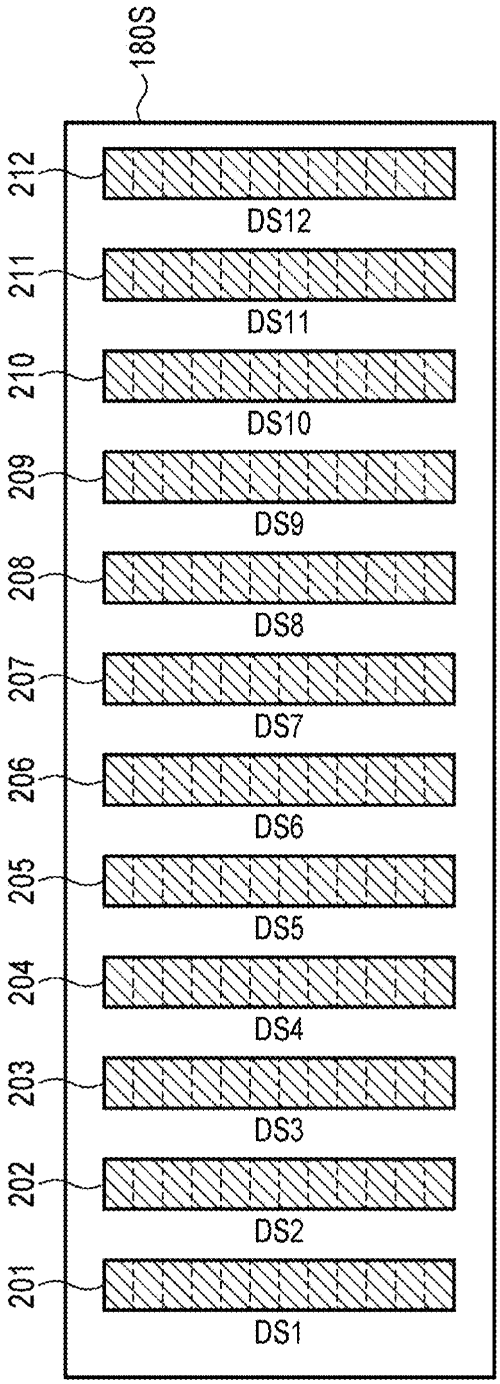
FIGS. 4A and 4B are schematic diagrams illustrating an example of storing pixel data in an S-memory group according to the first embodiment.
Figure 4B:
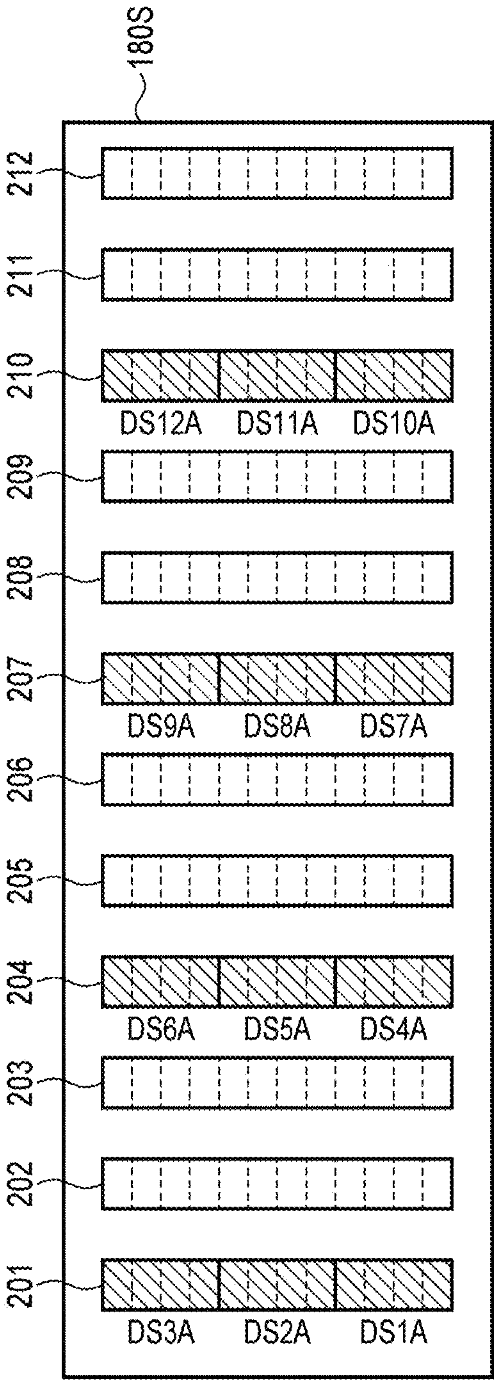

FIGS. 4A and 4B are schematic diagrams illustrating an example of storing pixel data in the S-memory group 180S. FIG. 4A illustrates an example of storing pixel data in the S-memory group 180S in the first mode, and FIG. 4B illustrates an example of storing pixel data in the S-memory group 180S in the second mode.

The S-memory group 180S includes a plurality of S-memories arranged so as to correspond to each of the plurality of signal processing circuits 140. In the example of FIGS. 4A and 4B, the S-memory group 180S includes a first S-memory 201 to a twelfth S-memory 212. FIGS. 4A and 4B illustrate an example of storing pixel data to the first S-memory 201 to the twelfth S-memory 212. Each of the first S-memory 201 to the twelfth S-memory 212 has memory cells of 12 bits. That is, each of the first S-memory 201 to the twelfth S-memory 212 has a storage capacity of 12 bits. One block of the first S-memory 201 to the twelfth S-memory 212 schematically illustrates a memory cell of one bit. A hatched memory cell indicates a memory cell in which pixel data is stored.

In the present embodiment, the plurality of output lines 113 are defined as a first output line to a twelfth output line. In the first mode, the pixel data output from the pixels via the first output line to the twelfth output line is denoted by pixel data DS1 to DS12, respectively. In the second mode, the pixel data output from the pixels via the first output line to the twelfth output line is denoted by pixel data DS1A to DS12A, respectively.

As illustrated in FIG. 4A, in the first mode, 12-bit pixel data for one pixel is stored in one memory. That is, the pixel data DS1 to the pixel data DS12 are stored in the first S-memory 201 to the twelfth S-memory 212, respectively.

As illustrated in FIG. 4B, in the second mode, pixel data for three pixels is stored in one memory. That is, the first S-memory 201 stores pixel data DS1A, DS2A, and DS3A for three pixels. The fourth S-memory 204 stores pixel data DS4A, DS5A, and DS6A for three pixels. The seventh S-memory 207 stores pixel data DS7A, DS8A, and DS9A for three pixels. The tenth S-memory 210 stores pixel data DS10A, DS11A, and DS12A for three pixels. Each of the pixel data DS1A to DS12A is 4-bit digital data.

Dummy data of a fixed value such as zero is stored in the second S-memory 202, the third S-memory 203, the fifth S-memory 205, the sixth S-memory 206, the eighth S-memory 208, the ninth S-memory 209, the eleventh S-memory 211, and the twelfth S-memory 212. By storing the dummy data in these S-memories, a change in the voltage in the memory is suppressed, so that power consumption and noise are reduced.

Figure 5:
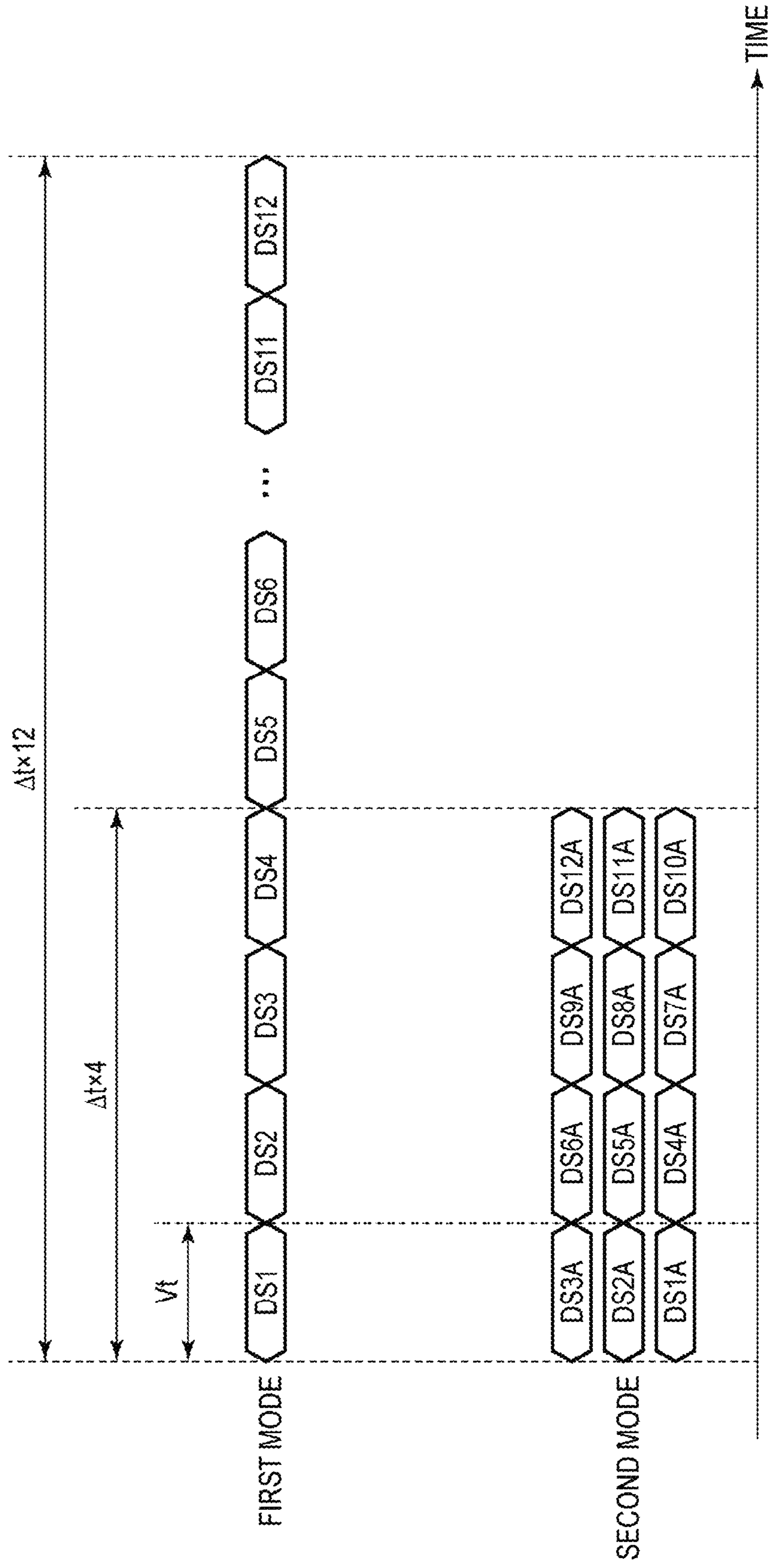
FIG. 5 is a timing chart illustrating an example of the operation of the imaging device according to the first embodiment.

FIG. 5 is a timing chart illustrating an example of the operation of the imaging device 100 according to the present embodiment. FIG. 5 illustrates the timings of the operation of reading out the pixel data stored in the S-memory group 180S and transferring the pixel data to the arithmetic processing circuit 191. The "first mode" in FIG. 5 indicates the timings of the operation in the first mode, and the "second mode" in FIG. 5 indicates the timings of the operation in the second mode.

In the first mode, the first S-memory 201 to the twelfth S-memory 212 are scanned in this order, and the pixel data DS1 to the pixel data DS12 are transferred to the arithmetic processing circuit 191 in this order. As illustrated in FIG. 5, when the time required to transfer one pixel data is $\Delta t$, the time required to transfer all the pixel data DS1 to DS12 is $\Delta t \times 12$.

In the second mode, the first S-memory 201, the fourth S-memory 204, the seventh S-memory 207, and the tenth S-memory 210 are scanned in this order, and the pixel data DS1A to DS12A are transferred to the arithmetic processing circuit 191. First, the first S-memory 201 is read, and the pixel data DS1A to DS3A are transferred to the arithmetic processing circuit 191. Next, the fourth S-memory 204 is read, and the pixel data DS4A to DS6A are transferred to the arithmetic processing circuit 191. Next, the seventh S-memory 207 is read, and the pixel data DS7A to DS9A are transferred to the arithmetic processing circuit 191. Subsequently, the tenth S-memory 210 is read, and the pixel data DS10A to DS12A are transferred to the arithmetic processing circuit 191. Since the S-memories storing the other dummy data are skipped in the scanning, the dummy data is not read. As illustrated in the "second mode" of FIG. 5, the time required to transfer all of the pixel data DS1 to DS12 is $\Delta t \times 4$. Therefore, in the second mode, the time required to transfer the pixel data is reduced to one third as compared with the first mode.

In the present embodiment, although the pixel data is stored in the first S-memory 201, the fourth S-memory 204, the seventh S-memory 207, and the tenth S-memory 210 in the second mode, the pixel data may be stored in other memories.

Figure 6:
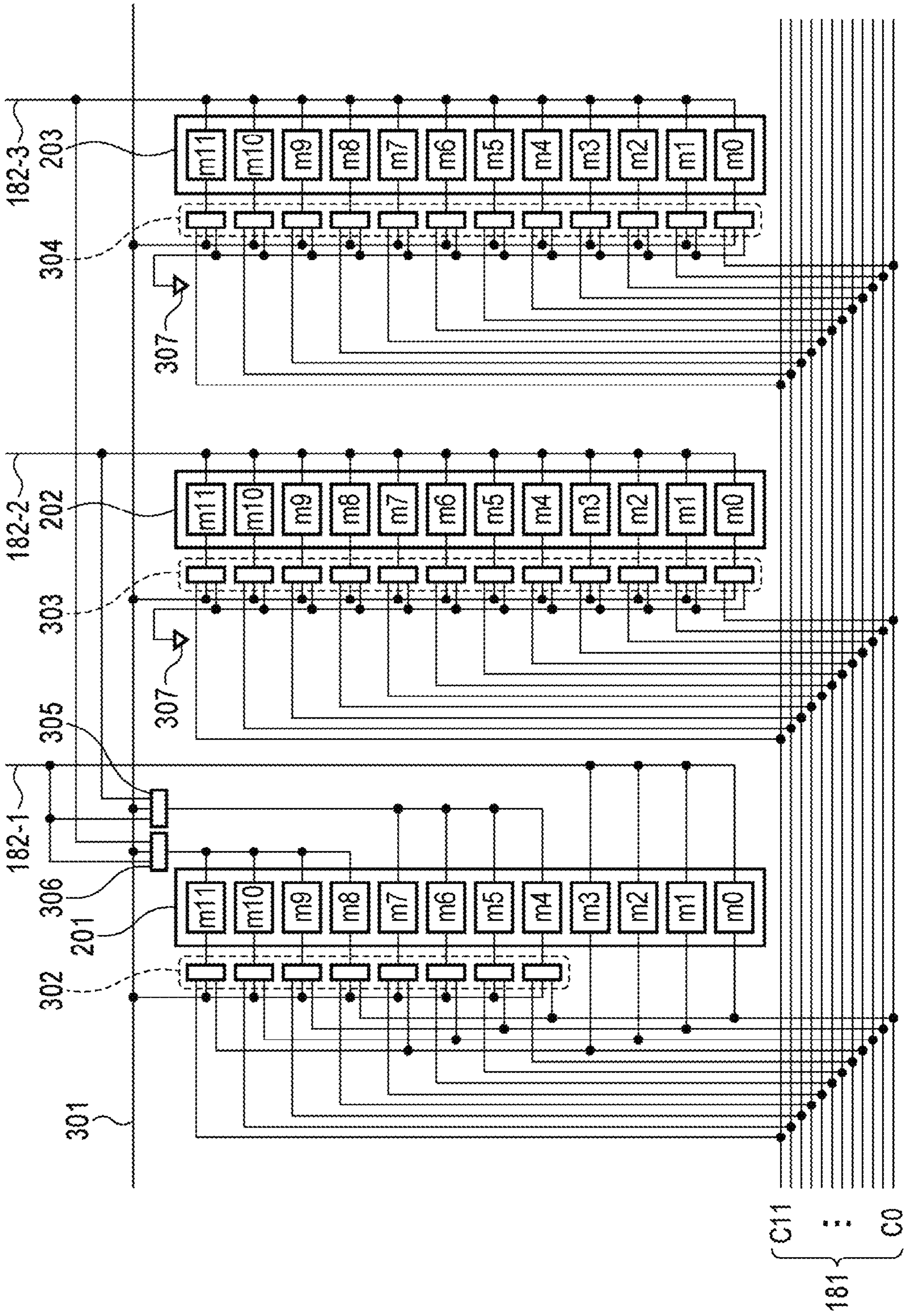
FIG. 6 is a circuit diagram illustrating a configuration example of a writing unit of the S-memory group according to the first embodiment.

Next, a configuration related to the writing unit MW of the S-memory group 180S in the present embodiment will be described. FIG. 6 is a circuit diagram illustrating a configuration example of the writing unit MW of the S-memory group 180S. FIG. 6 illustrates a detailed configuration and a connection relationship in the writing unit MW of the first S-memory 201, the second S-memory 202, and the third S-memory 203 illustrated in FIGS. 4A and 4B. In the S-memory group 180S, the configuration illustrated in FIG. 6 is repeatedly arranged for every three S-memories. Each S-memory includes 12-bit memory cells m0 to m11. The writing unit MW includes switch groups 302, 303, and 304 and switches 305 and 306.

Each of the memory cells m0 to m11 includes a data input terminal and a latch terminal. The count signal COUNT is input to the data input terminal, and the latch pulse signal LATCH is input to the latch terminal. Each of the memory cells m0 to m11 holds the count signal COUNT when the latch pulse signal LATCH changes from the active state to the inactive state.

The count signal line 181 is a 12-bit bus wiring including a zeroth bit line C0 to an eleventh bit line C11, and is connected to the counter 160 of FIG. 1. The counter 160 outputs a signal of each bit of the count signal COUNT to the zeroth bit line C0 to the eleventh bit line C11.

A mode switching signal is input to the writing unit MW via a mode signal line 301. The mode switching signal is a signal for switching between the first mode and the second mode described with reference to FIGS. 4A, 4B, and 5. The mode switching signal may be input from the timing control unit 190 or may be input from the outside of the imaging device 100. The mode switching signal is a 1-bit signal, and is set to the low level in the case of the first mode, and is set to the high level in the case of the second mode, for example. The mode signal line 301 is connected to the switch group 302, the switch group 303, the switch group 304, the switch 305, and the switch 306. These switches switch the connection relationship according to the level of the mode switching signal. That is, these switches function as a mode switching unit that switches the connection relationship in the writing unit MW in each of the first mode and the second mode in accordance with the level of the mode switching signal.

First, a connection relationship in the first mode will be described with reference to FIG. 6. When each switch is switched by the mode switching signal, the writing unit MW has the following connection relationship in the first mode.

The zeroth bit line C0 to the eleventh bit line C11 of the count signal line 181 are connected to the memory cells m0 to m11 of the first S-memory 201 to the third S-memory 203, respectively.

The latch pulse signal line 182-1 is connected to the memory cells m0 to m11 of the first S-memory 201 in common. The latch pulse signal line 182-2 is connected to the memory cells m0 to m11 of the second S-memory 202 in common, and the latch pulse signal line 182-3 is connected to the memory cells m0 to m11 of the third S-memory 203 in common.

The connections between the second S-memory 202 and the third S-memory 203 and the latch pulse signal lines 182-2 and 182-3 are the same in the case of the first mode and in the case of the second mode.

In such a connection configuration, the 12-bit count signal of the corresponding column is stored in each of the first S-memory 201 to the third S-memory 203 in response to the latch pulse signal. That is, pixel data for one pixel is stored in each of the S-memories.

Next, a connection relationship in the second mode will be described. When each switch is switched by the mode switching signal, the writing unit MW has the following connection relationship in the second mode.

The connection between the first S-memory 201 and the count signal line 181 will be described. The memory cells m0 to m3 are connected to the zeroth bit line C0 to the third bit line C3, respectively. The memory cells m4 to m7 are also connected to the zeroth bit line C0 to the third bit line C3, respectively. The memory cells m8 to m11 are also connected to the zeroth bit line C0 to the third bit line C3.

The connection between the first S-memory 201 and the latch pulse signal line will be described. The memory cells m0 to m3 are connected to the latch pulse signal line 182-1. The memory cells m4 to m7 are connected to the latch pulse signal line 182-2. The memory cells m8 to m11 are connected to the latch pulse signal line 182-3.

In such a connection configuration, 4-bit count signals for three columns are stored in the memory cells m0 to m3, the memory cells m4 to m7, and the memory cells m8 to m11 of the first S-memory 201 in response to the latch pulse signal. Since the 4-bit count signal corresponds to pixel data for one pixel, pixel data for three pixels is stored in the first S-memory 201.

A fixed potential node 307 is connected to the memory cells m0 to m11 of each of the second S-memory 202 and the third S-memory 203. With this configuration, a fixed value, which is dummy data, is stored in the memory cells m0 to m11. FIG. 6 illustrates an example in which the fixed potential node 307 is a ground potential node, but the fixed potential node 307 may be a power supply potential node.

The configuration in which a fixed value is stored in the memory cells m0 to m11 of each of the second S-memory 202 and the third S-memory 203 is not limited thereto. For example, the memory cells m0 to m11 may have a reset function of storing the low-level signal or a set function of storing the high-level signal.

Since the writing unit MW of the S-memory group 180S is configured as illustrated in FIG. 6, the operation illustrated in FIG. 4A is performed when the first mode is set, and the operation illustrated in FIG. 4B is performed when the second mode is set.

In the present embodiment, in the second mode, pixel data for three pixels are stored in one memory by setting pixel data for one pixel to four bits. However, the number of bits of the pixel data in the second mode is not limited thereto. By appropriately changing the number of bits of the pixel data in the second mode and further changing the configuration of the wirings and the switches, the number of pixel data to be stored in the memory may be appropriately changed.

Figure 7:
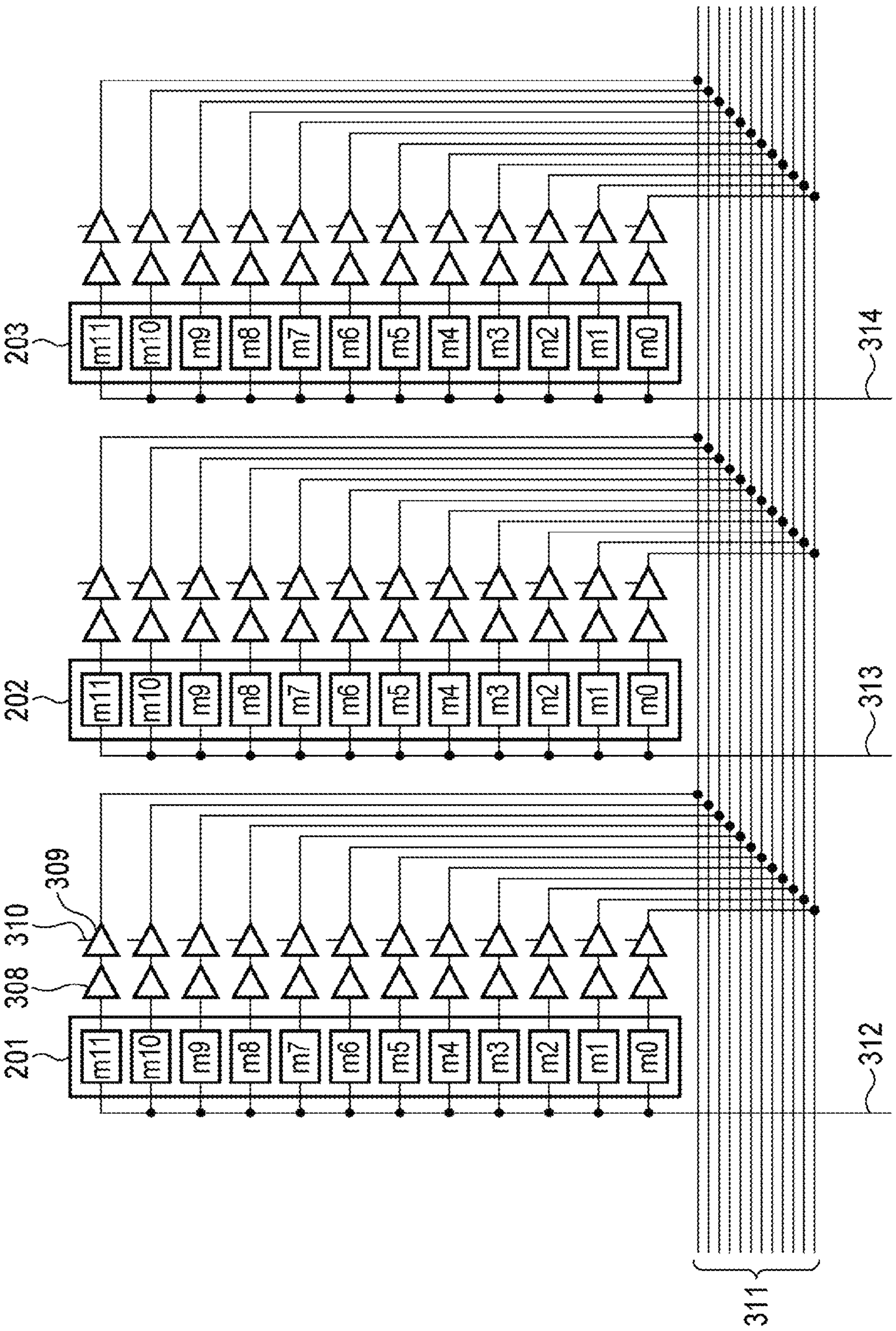
FIG. 7 is a circuit diagram illustrating a configuration example of a reading unit of the S-memory group according to the first embodiment.

Next, a configuration related to the reading unit of the S-memory group 180S in the present embodiment will be described. FIG. 7 is a circuit diagram illustrating a configuration example of the reading unit of the S-memory group 180S according to the present embodiment. FIG. 7 exemplifies detailed configurations and connection relationships in the reading unit of the first S-memory 201, the second S-memory 202, and the third S-memory 203 illustrated in FIG. 6. In the S-memory group 180S, a plurality of buffers 308 and a plurality of tri-state buffers 309 are arranged so as to correspond to the memory cells m0 to m11.

An output portion of each of the memory cells m0 to m11 is connected to an input terminal of the corresponding buffer 308. An output terminal of each buffer 308 is connected to an input terminal of the corresponding tri-state buffer 309. An output terminal of each tri-state buffer 309 is connected to a signal line of a corresponding bit among twelve signal lines constituting the output line 311 for outputting the 12-bit signal. The output line 311 transmits signals from the memory cells m0 to m11 to the arithmetic processing circuit 191.

A selection signal line 312 is connected to the memory cells m0 to m11 of the first S-memory 201. A selection signal line 313 is connected to the memory cells m0 to m11 of the second S-memory 202. A selection signal line 314 is connected to the memory cells m0 to m11 of the third S-memory 203. The horizontal scanning circuit 130 illustrated in FIG. 1 outputs a selection signal to the memory cells m0 to m11 of the corresponding S-memory via the selection signal lines 312 to 314. The S-memory selected by the selection signal outputs image data.

A control signal is input to the reading unit through a buffer control line 310. The buffer control line 310 is connected to each tri-state buffer 309. The tri-state buffer 309 switches between a signal output state and a high impedance state of the tri-state buffer 309 according to the control signal input via the buffer control line 310. This control signal may be input from the timing control unit 190 or may be input from the outside of the imaging device 100.

Figure 8A:
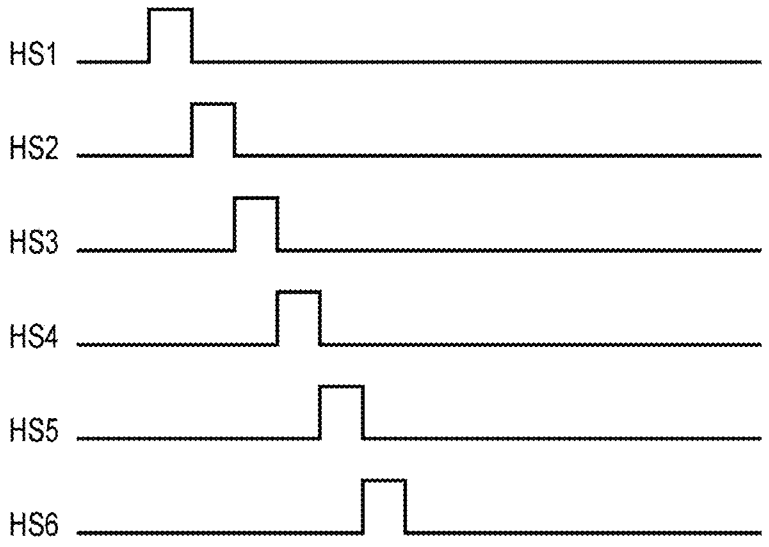
FIGS. 8A and 8B are timing charts illustrating an example of an operation of the reading unit of the S-memory group according to the first embodiment.
Figure 8B:
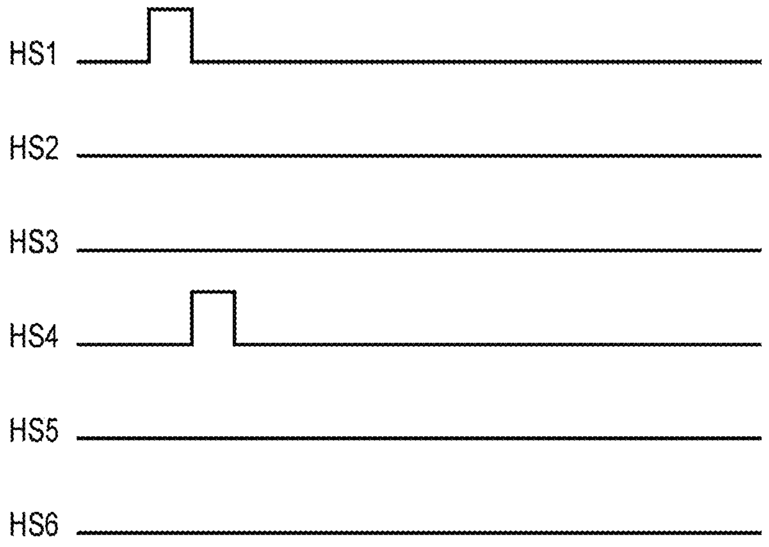

FIGS. 8A and 8B are timing charts illustrating an example of an operation of the reading unit of the S-memory group 180S according to the present embodiment. To simplify the description, FIGS. 8A and 8B illustrate only waveforms of selection signals HS1 to HS6 input to the first S-memory 201 to the sixth S-memory 206 indicated in FIGS. 4A and 4B. When each of the selection signals HS1 to HS6 is at the high level, the corresponding S-memory is selected and the pixel data is read.

FIG. 8A illustrates waveforms of the selection signals HS1 to HS6 in the case where the first mode is set. As illustrated in FIG. 4A, when the first mode is set, pixel data is stored in each of the first S-memory 201 to the sixth S-memory 206. The selection signals HS1 to HS6 sequentially become the high level, whereby the pixel data is sequentially read from the first S-memory 201 to the sixth S-memory 206. At the timing when each of the selection signals HS1 to HS6 becomes the high level, corresponding tri-state buffer 309 is controlled to be in the signal output state sequentially.

FIG. 8B illustrates waveforms of the selection signals HS1 to HS6 in the case where the second mode is set. As illustrated in FIG. 4B, when the second mode is set, pixel data is stored in each of the first S-memory 201 and the fourth S-memory 204. Dummy data is stored in each of the second S-memory 202, the third S-memory 203, the fifth S-memory 205, and the sixth S-memory 206. As illustrated in FIG. 8B, after the selection signal HS1 becomes the high level, the selection signal HS4 becomes the high level. On the other hand, the selection signals HS2, HS3, HS5, and HS6 remain at the low level. Therefore, the pixel data is sequentially read from the first S-memory 201 and the fourth S-memory 204. In contrast, the reading operation from the second S-memory 202, the third S-memory 203, the fifth S-memory 205, and the sixth S-memory 206 is not performed.

As described above, since the selection signals HS1 to HS6 are different between the first mode and the second mode, the operation of the reading unit of the S-memory group 180S is different. However, as illustrated in FIG. 7, the circuit configuration of the reading unit of the S-memory group 180S is common in both the first mode and the second mode, and the operation can be switched by changing the input signal.

Although the S-memory group 180S storing the S-signals has been described in the present embodiment, the same configuration and operation as those of the S-memory group 180S can be applied to the N-memory group 180N storing the N-signals. The imaging device 100 may include a memory group that stores noise corrected signals obtained by subtracting the N-signals from the S-signals, and the same configuration and operation as those of the S-memory group 180S may be applied to this memory group.

In the imaging device 100 according to the present embodiment, pixel data corresponding to two or more pixels is stored in the second mode in a memory that stores pixel data corresponding to one pixel in the first mode. The number of bits of the memory cells in each memory is equal to or greater than the number of bits of the pixel data in the first mode. In the example of FIGS. 4A and 4B, the number of bits of the pixel data in the second mode is a divisor of the number of bits of the pixel data in the first mode, but the number of bits of the pixel data in the second mode is not limited thereto.

For example, in a case where each of the memories has memory cells of 12 bits, the pixel data in the first mode may be 11 bits. In addition, in a case where each of the memories has memory cells of 12 bits, the pixel data in the second mode may be three bits, and the pixel data of four pixels may be stored in one memory.

An outline of the operation of the present embodiment will be described by generalizing the number of bits of the memory and the number of bits of the pixel data. In a case where each of the memories includes memory cells of k bits (k is an integer of two or more), the pixel data in the first mode is m bits (m is an integer of two or more and k or less). Since pixel data of two or more pixels is stored in one memory in the second mode, the pixel data in the second mode is n bits (n is an integer of one or more and m/2 or less).

In the first mode, the pixel signal from a first output line is AD-converted into first pixel data of m bits and stored in a first memory. The pixel signal from a second output line is AD-converted into second pixel data of m bits and stored in a second memory. Then, the first pixel data is read from the first memory, and the second pixel data is read from the second memory.

In the second mode, the pixel signal from the first output line is AD-converted into third pixel data of n bits and stored in the first memory. The pixel signal from the second output line is AD-converted into fourth pixel data of n bits and stored in the first memory. Then, the third pixel data and the fourth pixel data are read from the first memory. The third pixel data and the fourth pixel data may be read simultaneously.

As described above, by storing a plurality of pieces of pixel data in the second mode to the memory that stores pixel data corresponding to one pixel in the first mode, a plurality of pieces of pixel data can be read by performing a reading operation for one memory. Therefore, the speed of the reading operation can be increased, and the frame reading speed can be improved. Therefore, according to the present embodiment, an imaging device and a method of driving the imaging device capable of high-speed operation are provided.

The present embodiment is also applicable to an imaging device for use in counting the number of incident quantums by determining the incidence of quantums such as photons and electrons from pixel data. In such an imaging device, by setting the second mode to improve the frame reading speed, it is possible to shorten the imaging time and reduce the blur.

Another factor that may improve the reading speed in the imaging device according to the present embodiment will be described. In a plurality of pixels 111 forming a plurality of rows and a plurality of columns, a period from when a certain pixel row is in the active state to when the next pixel row is in the active state is defined as one horizontal scanning period. In the operation of AD-converting the pixel signals and writing them into the memory, the writing operation for one pixel row is executed in parallel by the plurality of signal processing circuits 140. That is, the whole of one horizontal scanning period can be allocated to the writing operation for one pixel. On the other hand, in the operation of reading the pixel data from the memory, since the output line is shared by a plurality of memories, the pixel data for one pixel row is transferred to the arithmetic processing circuit 191 in a time-division manner. For these reasons, the time allocated to the reading operation for one pixel in one horizontal scanning period is shorter than the time allocated to the writing operation for one pixel in one horizontal scanning period. Therefore, high-speed operation is required for the reading operation. In addition, in order to increase the speed of the reading operation, the parasitic capacitance of the output line from which the pixel data is read is required to be small. In an imaging device in which a method of allocating an output line for outputting pixel data from a memory is changed when the number of bits is changed as disclosed in Japanese Patent Application Laid- Open No. 2005-333316, parasitic capacitance may increase because a switch or the like is added to the output line.

On the other hand, in the imaging device 100 according to the present embodiment, a switch for the mode switching is arranged in the writing unit of the memory. Therefore, the parasitic capacitance of the output line is reduced as compared with the configuration in which a switch for the mode switching is arranged in the reading unit of the memory. Therefore, the reading operation can be speeded up.

Second Embodiment

An imaging device 100A according to the second embodiment will be described with reference to FIGS. 9 to 12. In the present embodiment, the number of bits of pixel data in the first mode is 12 bits as in the first embodiment. On the other hand, unlike the first embodiment, the number of bits of pixel data in the second mode is one bit. In the present embodiment, description of elements common to those of the first embodiment may be omitted or simplified.

Figure 9:
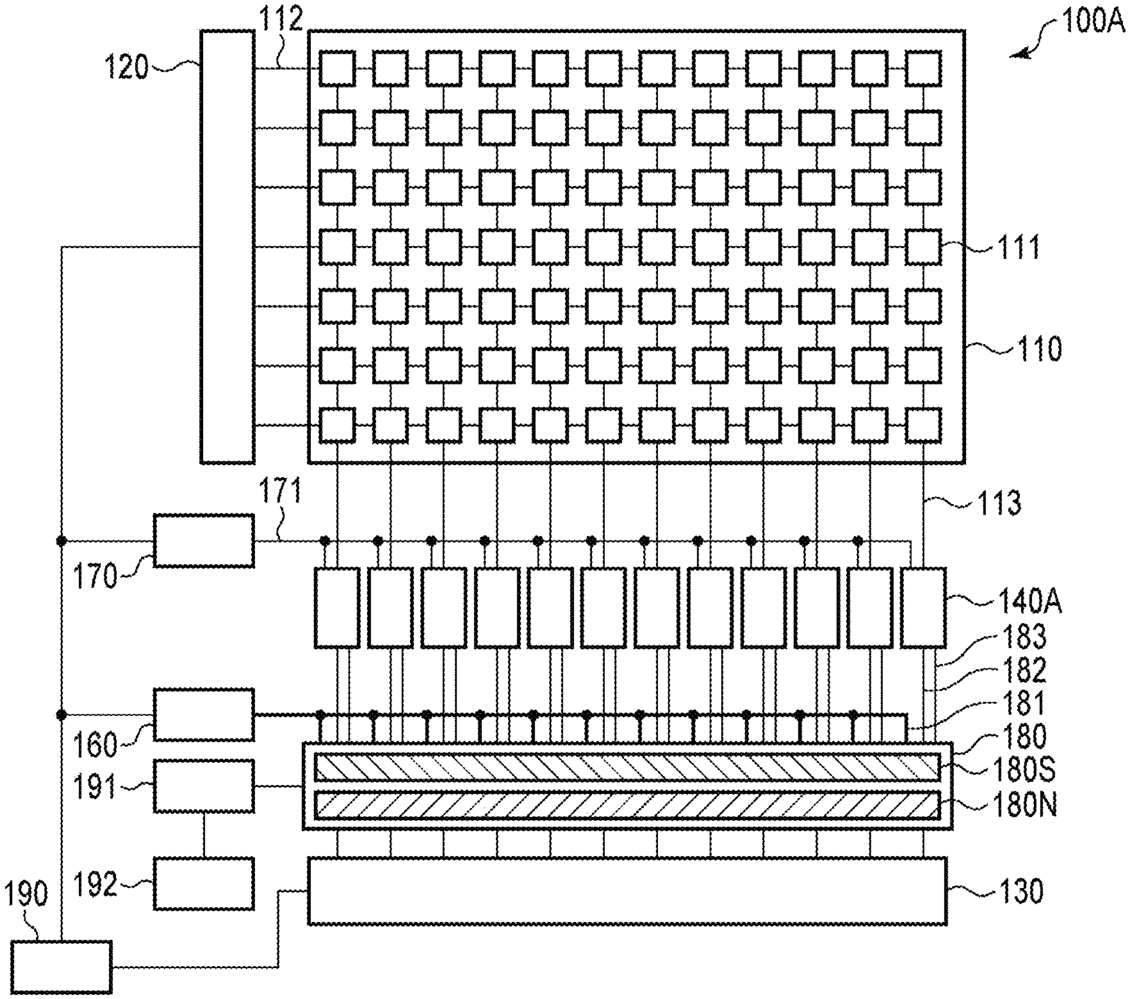
FIG. 9 is a block diagram schematically illustrating an overall configuration of an imaging device according to a second embodiment.

FIG. 9 is a block diagram schematically illustrating an overall configuration of an imaging device 100A according to the present embodiment. The imaging device 100A according to the present embodiment is different from the imaging device 100 according to the first embodiment in a configuration of a signal processing circuit 140A. The signal processing circuit 140A is connected to the memory group 180 via a binarized output signal line 183 in addition to the latch pulse signal line 182.

In the first mode, the signal processing circuit 140A supplies the latch pulse signal to the memory group 180 via the latch pulse signal line 182. In the second mode, the signal processing circuit 140A supplies a binarized signal, which is 1-bit digital data, to the memory group 180 via the binarized output signal line 183.

Figure 10:
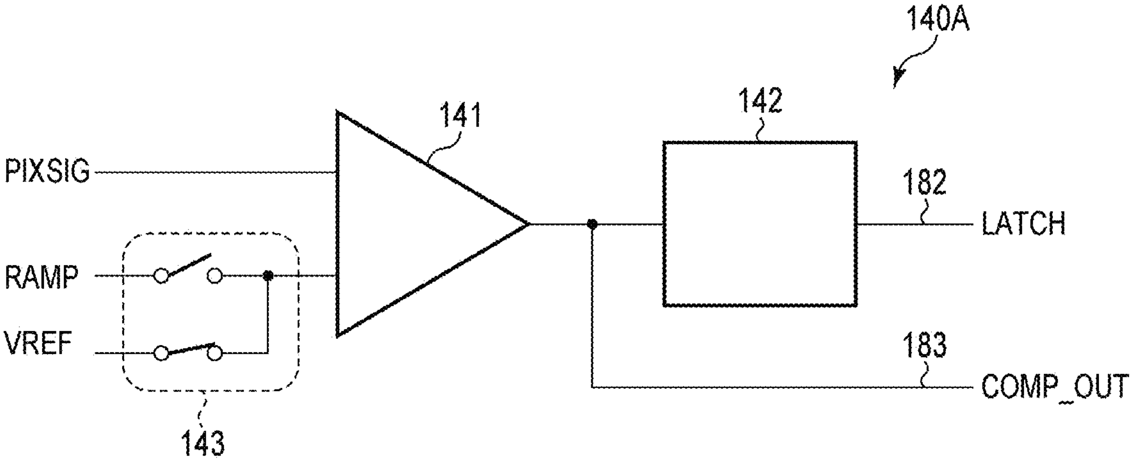
FIG. 10 is a circuit diagram illustrating an example of an equivalent circuit of a signal processing circuit according to the second embodiment.

FIG. 10 is a circuit diagram illustrating an example of an equivalent circuit of the signal processing circuit 140A according to the present embodiment. The signal processing circuit 140A includes a comparator 141, a pulse generation circuit 142, and a switch group 143. The pixel signal PIXSIG is input to the comparator 141. Further, either the ramp signal RAMP or a reference voltage VREF, which is a fixed voltage, is input to the comparator 141. In the first mode, the ramp signal RAMP is input to the comparator 141 as in the first embodiment. In the second mode, the reference voltage VREF is input to the comparator 141. In the present embodiment, the ramp signal RAMP and the reference voltage VREF are switched by the switch group 143 that operates based on a control signal indicating the mode. Alternatively, the ramp signal RAMP and the reference voltage VREF may be switched on the output side of the reference signal generation circuit 170. Since the operation in the first mode is the same as that in the first embodiment, the description thereof will be omitted.

In the second mode, the comparator 141 outputs the output signal COMP_OUT to the binarized output signal line 183 based on the result of comparison between the pixel signal PIXSIG and the reference voltage VREF. The output signal COMP_OUT is 1-bit digital data. When the potential of the pixel signal PIXSIG is higher than the reference voltage VREF, the output signal COMP_OUT is at the low level. When the potential of the pixel signal PIXSIG is lower than the reference voltage VREF, the output signal COMP_OUT is at the high level. The output signal COMP_OUT is stored in the S-memory group 180S as 1-bit pixel data.

Figure 11A:
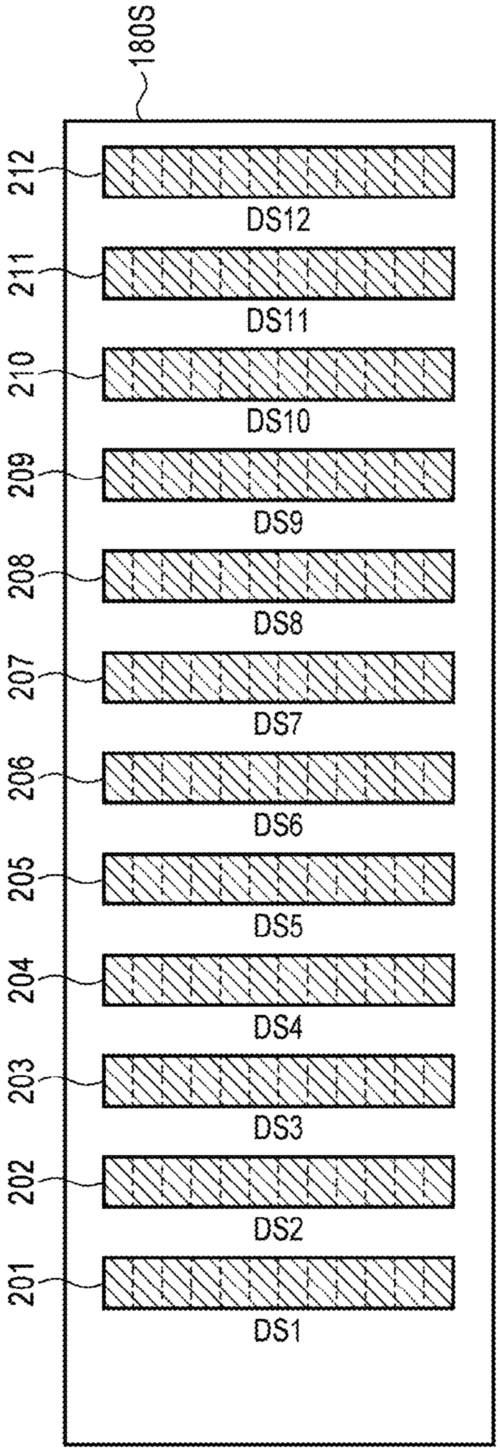
FIGS. 11A and 11B are schematic diagrams illustrating an example of storing pixel data in an S-memory group according to the second embodiment.
Figure 11B:
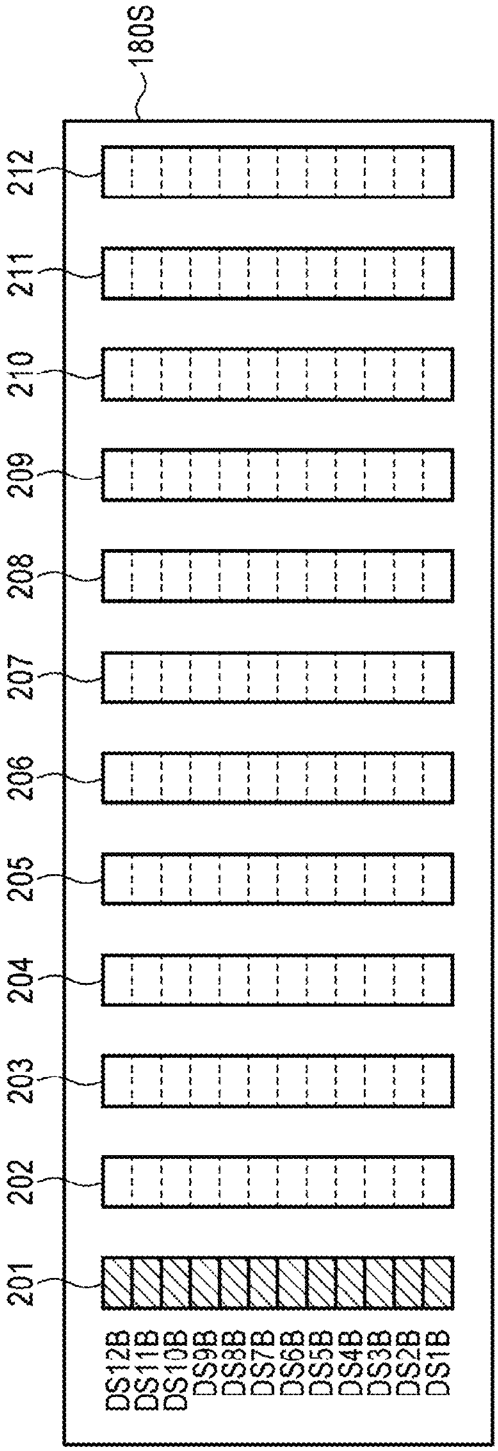

FIGS. 11A and 11B are schematic diagrams illustrating an example of storing pixel data in the S-memory group 180S according to the present embodiment. FIG. 11A illustrates an example of storing pixel data in the S-memory group 180S in the first mode, and FIG. 11B illustrates an example of storing pixel data in the S-memory group 180S in the second mode.

Similar to FIGS. 4A and 4B in the first embodiment, FIGS. 11A and 11B illustrate the case where the S-memory group 180S includes the first S-memory 201 to the twelfth S-memory 212. Each of the first S-memory 201 to the twelfth S-memory 212 has memory cells of 12 bits. One block of the first S-memory 201 to the twelfth S-memory 212 schematically illustrates a memory cell of one bit. A hatched memory cell indicates a memory cell in which pixel data is stored.

Further, similarly to the first embodiment, in the present embodiment, the plurality of output lines 113 are defined as the first output line to the twelfth output line. In the first mode, the pixel data output from the pixels via the first output line to the twelfth output line is denoted by pixel data DS1 to DS12, respectively. In addition, in the second mode, the pixel data output from the pixels via the first output line to the twelfth output line is denoted by pixel data DS1B to DS12B, respectively.

As illustrated in FIG. 11A, in the first mode, 12-bit pixel data for one pixel is stored in one memory. That is, the pixel data DS1 to the pixel data DS12 are stored in the first S-memory 201 to the twelfth S-memory 212, respectively.

As illustrated in FIG. 11B, in the second mode, the first S-memory 201 stores pixel data DS1B to the pixel data DS12B for 12 pixels. Dummy data is stored in the second S-memory 202 to the twelfth S-memory 212. Each of the pixel data DS1B to DS12B is 1-bit digital data.

Figure 12:
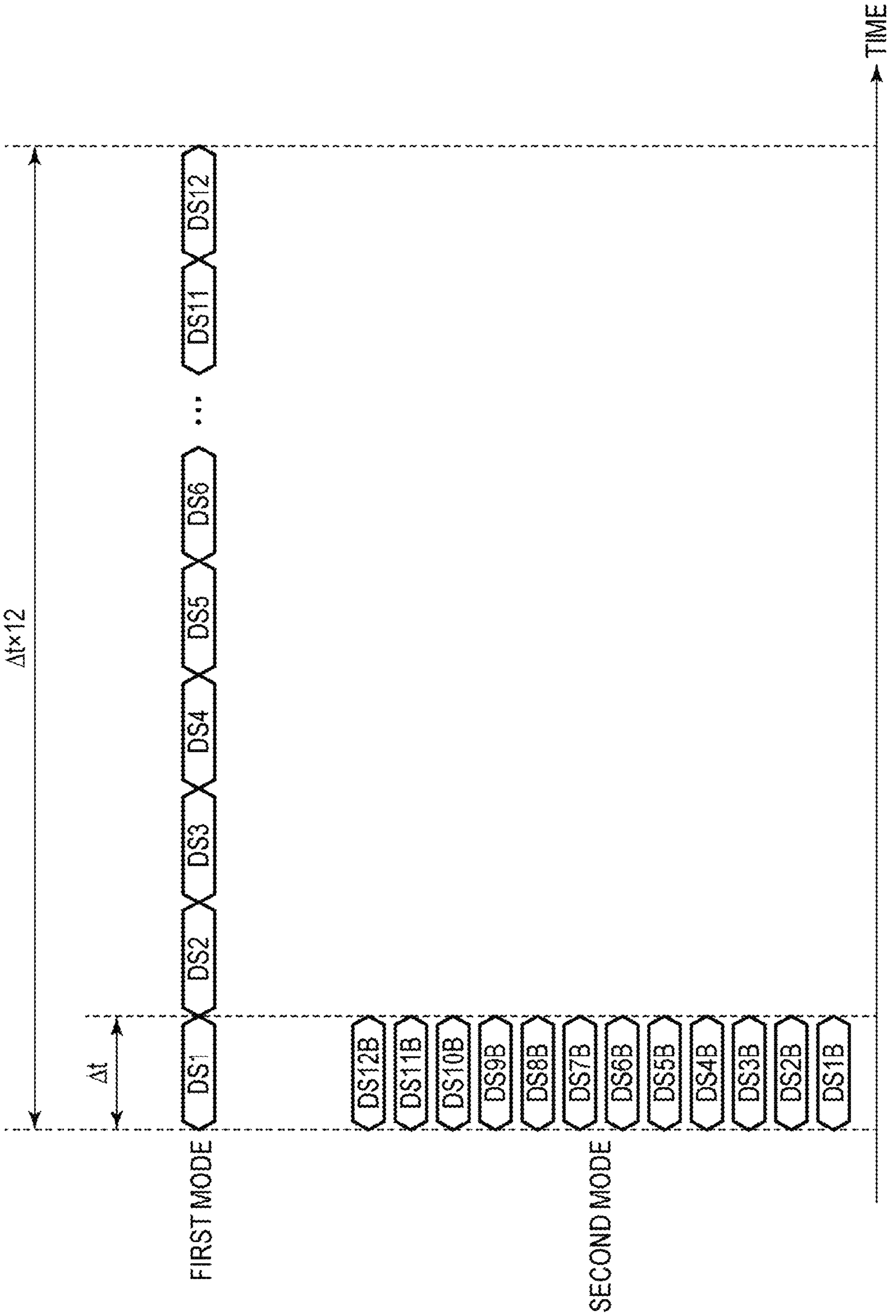
FIG. 12 is a timing chart illustrating an example of the operation of the imaging device according to the second embodiment.

FIG. 12 is a timing chart illustrating an example of the operation of the imaging device 100A according to the present embodiment. FIG. 12 illustrates the timings of the operation of reading out the pixel data stored in the S-memory group 180S and transferring the pixel data to the arithmetic processing circuit 191. The "first mode" in FIG. 12 indicates the timings of the operation in the first mode, and the "second mode" in FIG. 12 indicates the timings of the operation in the second mode.

In the first mode, the first S-memory 201 to the twelfth S-memory 212 are scanned in this order, and the pixel data DS1 to the pixel data DS12 are transferred to the arithmetic processing circuit 191 in this order. As illustrated in FIG. 12, when the time required to transfer one pixel data is $\Delta t$, the time required to transfer all the pixel data DS1 to DS12 is $\Delta t \times 12$.

In the second mode, when the first S-memory 201 is read, the pixel data DS1B to the pixel data DS12B are transferred to the arithmetic processing circuit 191. As illustrated in FIG. 12, the time required to transfer all of the pixel data DS1B to DS12B is $\Delta t$. Therefore, in the second mode, the time required to transfer the pixel data is reduced to one twelfth as compared with the first mode.

In the present embodiment, although the pixel data is stored in the first S-memory 201 in the second mode, the pixel data may be stored in other memories.

According to the present embodiment, as in the first embodiment, an imaging device and a method of driving the imaging device capable of high-speed operation are provided. Further, in the present embodiment, since the pixel data in the second mode is one bit, the reading operation can be further speeded up as compared with the case where the pixel data is a plurality of bits.

The present embodiment is also applicable to an imaging device for use in counting the number of incident quantums by determining the incidence of quantums such as photons and electrons from 1-bit pixel data. In such an imaging device, by setting the second mode to improve the frame reading speed, it is possible to shorten the imaging time and reduce the blur.

Third Embodiment

An imaging device according to a third embodiment will be described with reference to FIGS. 13A to 14. In the present embodiment, the number of bits of the pixel data of the S-signal in the first mode is 12 bits, and the number of bits of the pixel data of the N-signal in the first mode is eight bits. Since the N-signal is the output signal of the pixel in the reset state, the signal range of the N-signal is less than the signal range of the S-signal. Therefore, the number of bits of the pixel data of the N-signal is less than the number of bits of the pixel data of the S-signal. The number of bits of the pixel data of the S-signal in the second mode is four bits. In the present embodiment, the method of storing the pixel data in the memory group 180 is different from that of the first embodiment, that is, the pixel data of the S-signal is stored in the N-memory group 180N in the second mode. In the present embodiment, description of elements common to those of the first embodiment may be omitted or simplified.

Figure 13A:
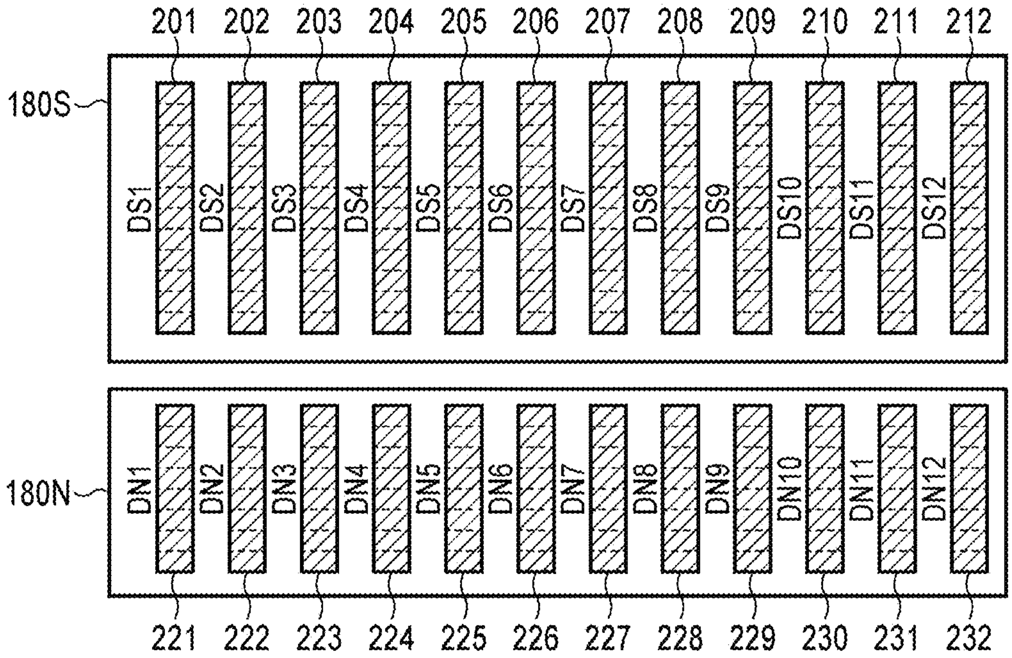
FIGS. 13A and 13B are schematic diagrams illustrating an example of storing pixel data in an S-memory group and an N-memory group according to a third embodiment.
Figure 13B:
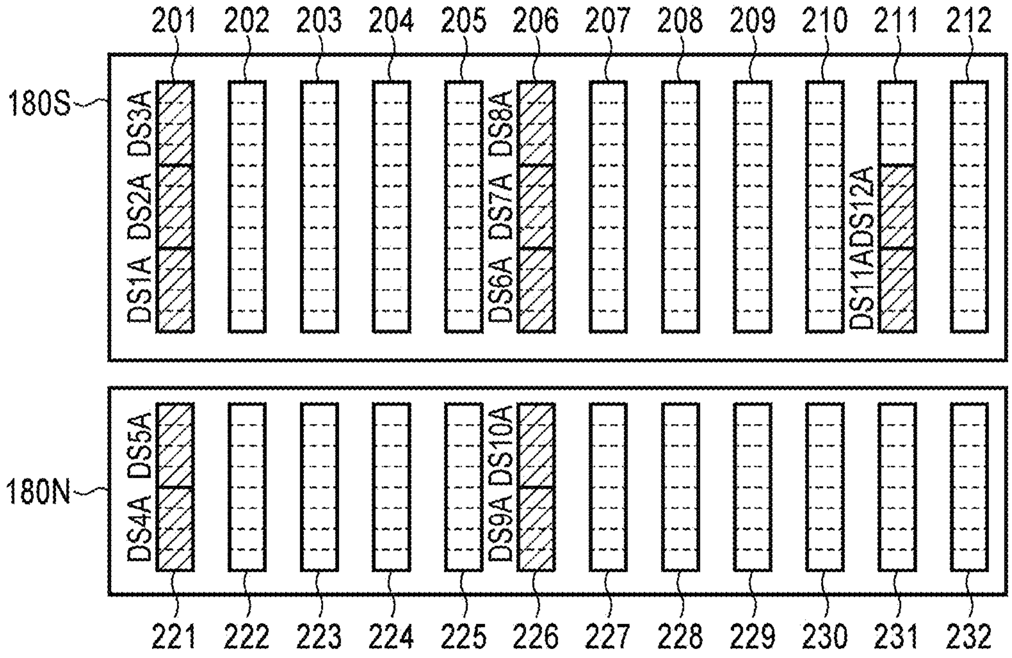

FIGS. 13A and 13B are schematic diagrams illustrating an example of storing pixel data in the S-memory group 180S and the N-memory group 180N according to the present embodiment. FIG. 13A illustrates an example of storing pixel data in the S-memory group 180S and the N-memory group 180N in the first mode, and FIG. 13B illustrates an example of storing pixel data in the S-memory group 180S and the N-memory group 180N in the second mode.

FIGS. 13A and 13B illustrate a case in which the S-memory group 180S includes a first S-memory 201 to a twelfth S-memory 212, and the N-memory group 180N includes a first S-memory 221 to a twelfth N-memory 232. Each of the first S-memory 201 to the twelfth S-memory 212 has memory cells of 12 bits. Each of the first N-memory 221 to the twelfth N-memory 232 has memory cells of eight bits. A hatched memory cell indicates a memory cell in which pixel data is stored.

Further, similarly to the first embodiment, in the present embodiment, the plurality of output lines 113 are defined as the first output line to the twelfth output line. In addition, in the first mode, the pixel data of the S-signals output from the pixels via the first output line to the twelfth output line is respectively denoted by pixel data DS1 to DS12, and the pixel data of the N-signals output from the pixels via the first output line to the twelfth output line is respectively denoted by pixel data DN1 to DN12. In addition, in the second mode, the pixel data of the S-signals output from the pixels via the first output line to the twelfth output line is denoted by pixel data DS1A to DS12A, respectively.

As illustrated in FIG. 13A, in the first mode, pixel data of an S-signal for one pixel is stored in one S-memory. That is, the pixel data DS1 to the pixel data DS12 are stored in the first S-memory 201 to the twelfth S-memory 212, respectively.

As illustrated in FIG. 13A, in the first mode, pixel data of an N-signal for one pixel is stored in one N-memory. That is, the pixel data DN1 to the pixel data DN12 are stored in the first N-memory 221 to the twelfth N-memory 232, respectively.

As illustrated in FIG. 13B, in the second mode, pixel data of S-signals for three pixels is stored in one S-memory, and pixel data of S-signals for two pixels is stored in one N-memory. That is, the first S-memory 201 stores the pixel data DS1A, DS2A, and DS3A for three pixels. The first N-memory 221 stores the pixel data DS4A and DS5A for two pixels. The sixth S-memory 206 stores the pixel data DS6A, DS7A, and DS8A for three pixels. The sixth N-memory 226 stores the pixel data DS9A and DS10A for two pixels. The eleventh S-memory 211 stores the pixel data DS11A and DS12A for two pixels. Each of the pixel data DS1A to DS12A is digital data of four bits. Dummy data is stored in a memory in which pixel data is not stored. Depending on the number of output lines 113 and the number of memories, both pixel data and dummy data may be stored in one memory as in the eleventh S-memory 211.

In the second mode in the present embodiment, since the pixel data of the S-signals is stored in the N-memory group 180N as described above, the pixel data of the N-signals is not acquired. Instead, in the present embodiment, an S-signal may be acquired in a state where light is not incident on the pixel array 110, and the S-signal may be used as an N-signal. This S-signal is referred to as a dark signal. The dark signal is stored in a dark signal storage unit provided separately from the memory group 180. The dark signal storage unit may be arranged in the imaging device 100 or may be arranged in a storage device that is provided outside the imaging device 100 and is connected thereto. In the second mode, the arithmetic processing circuit 191 performs processing of calculating a difference between the S-signal and the dark signal, so that noise such as fixed pattern noise can be corrected.

Figure 14:
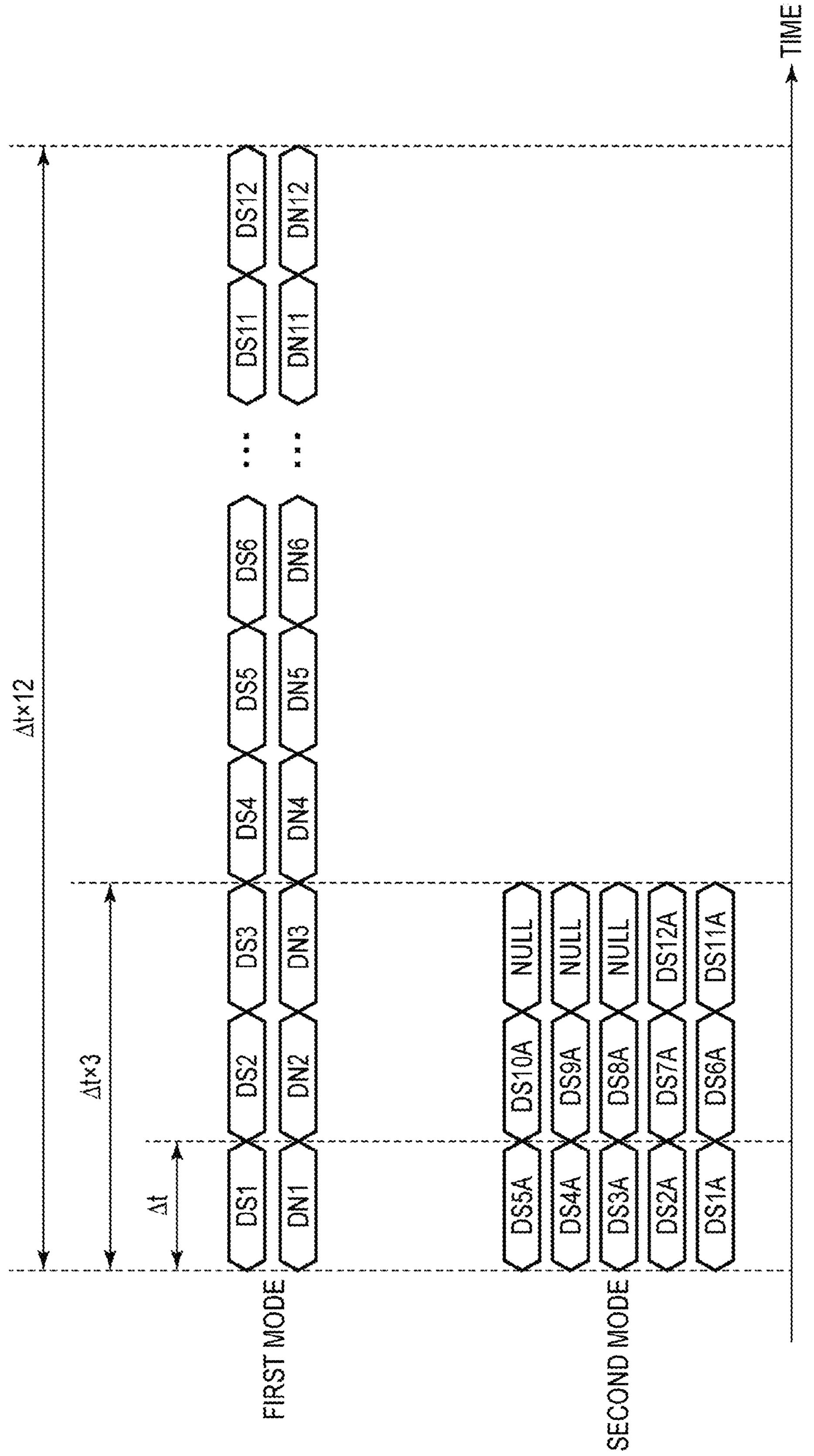
FIG. 14 is a timing chart illustrating an example of an operation of the imaging device according to the third embodiment.

FIG. 14 is a timing chart illustrating an example of the operation of the imaging device 100 according to the present embodiment. FIG. 14 illustrates timings of operations of reading pixel data stored in the S-memory group 180S and the N-memory group 180N and transferring the pixel data to the arithmetic processing circuit 191. The "first mode" in FIG. 14 indicates the timing of the operation in the first mode, and the "second mode" in FIG. 14 indicates the timing of the operation in the second mode. The "NULL" in the "second mode" in FIG. 14 indicates dummy data.

In the first mode, the first S-memory 201 to the twelfth S-memory 212 are scanned in this order, and the pixel data DS1 to the pixel data DS12 are transferred to the arithmetic processing circuit 191 in this order. In parallel with this, the first N-memory 221 to the twelfth N-memory 232 are scanned in this order, and the pixel data DN1 to the pixel data DN12 are also transferred to the arithmetic processing circuit 191 in this order. The time required to transfer all of the pixel data DS1 to DS12 and DN1 to DN12 is $\Delta t \times 12$.

In the second mode, the first S-memory 201, the first N-memory 221, the sixth S-memory 206, the sixth N-memory 226, the eleventh S-memory 211, and the eleventh N-memory 231 are scanned, and the pixel data DS1A to the pixel data DS12A are transferred to the arithmetic processing circuit 191. First, the first S-memory 201 and the first N-memory 221 are simultaneously read, and the pixel data DS1A to the pixel data DSSA are transferred to the arithmetic processing circuit 191. Next, the sixth S-memory 206 and the sixth N-memory 226 are simultaneously read, and the pixel data DS6A to the pixel data DS10A are transferred to the arithmetic processing circuit 191. Subsequently, the eleventh S-memory 211 and the eleventh N-memory 231 are simultaneously read, and the pixel data DS11A, the pixel data DS12A, and the dummy data are transferred to the arithmetic processing circuit 191. The dummy data is stored in a part of the memory cells of the eleventh S-memory 211, and the dummy data is also read at the same time, and thus an exceptional operation for the memory cells in which the dummy data is stored may be unnecessary, so that the circuit operation and the circuit configuration may be simplified. Further, by reading out the eleventh N-memory 231 in which the dummy data is stored simultaneously with the eleventh S-memory 211, an exceptional operation for the eleventh N-memory 231 may be unnecessary, so that the circuit operation and the circuit configuration may be simplified. Since the memories storing the other dummy data are skipped in the scanning, the dummy data is not read from these memories. As illustrated in the "second mode" of FIG. 14, the time required to transfer all of the pixel data DS1A to DS12A is $\Delta t \times 3$. Therefore, in the second mode, the time required to transfer the pixel data is reduced to one fourth as compared with the first mode.

Although the pixel data is stored in the first S-memory 201, the first N-memory 221, the fourth S-memory 204, the sixth S-memory 206, the sixth N-memory 226, and the eleventh S-memory 211 in the second mode of the present embodiment, pixel data may be stored in other memories.

An outline of the operation of the present embodiment will be described by generalizing the number of bits of the memory and the number of bits of the pixel data. The number of bits of the memory cells in each of the S-memory and the N-memory is equal to or greater than the number of bits of the pixel data in the first mode. It is assumed that each of the S-memories includes memory cells of i bits (i is an integer of two or more), and each of the N-memories includes memory cells of j bits (j is an integer of two or more). In this case, the pixel data (first light data) of the S-signal in the first mode is p bits (p is an integer of two or more and i or less), and the pixel data (first noise data) of the N-signal in the first mode is q bits (q is an integer of one or more and j or less).

In the second mode, pixel data (third light data and fourth light data) of the S-signals of two or more pixels is stored in one S-memory, and pixel data (third light data and fourth light data) of the S-signals of one or more pixels is stored in one N-memory. Therefore, the pixel data in the second mode is r bits (r is an integer of one or more, p/2 or less, and q or less).

In the first mode, a light signal based on charges generated by photoelectric conversion is AD-converted into pixel data of p bits (p is an integer of two or more and i or less), and the pixel data is stored in the S-memory. Then, the noise signal output from the pixel in the reset state is AD-converted into pixel data of q bits (q is an integer of one or more and j or less), and the pixel data is stored in the N-memory. In the second mode, a light signal based on charges generated by photoelectric conversion is AD-converted into pixel data of r bits (r is an integer of one or more, p/2 or less, and q or less), and the pixel data is stored in the S-memory and the N-memory.

According to the present embodiment, as in the first embodiment, an imaging device and a method of driving the imaging device capable of high-speed operation are provided. In addition, in the present embodiment, since the pixel data of the S-signals is stored in both the S-memory and the N-memory in the second mode, it is possible to increase the number of pieces of pixel data that is simultaneously read, and it is possible to further speed up the reading operation.

Fourth Embodiment

Figure 15:
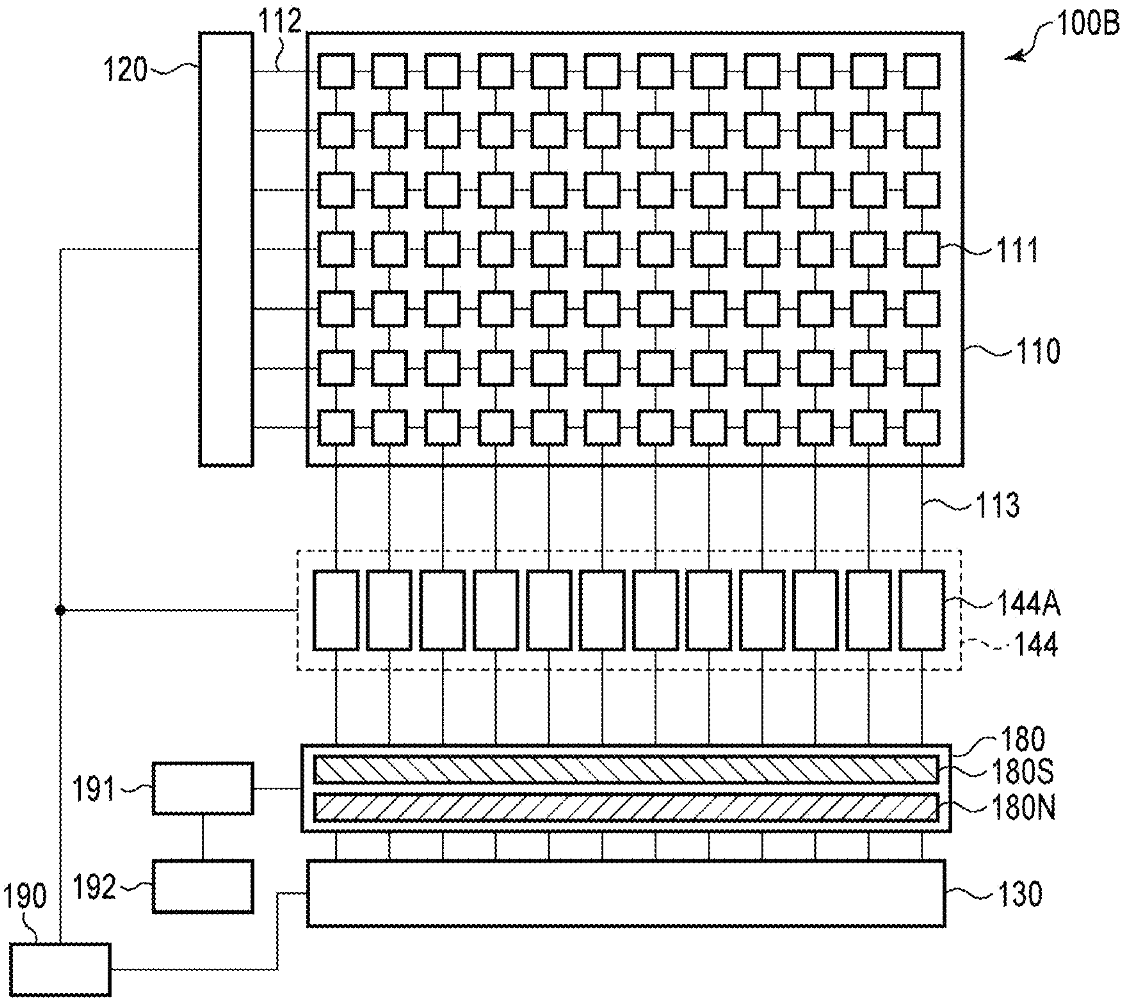
FIG. 15 is a block diagram schematically illustrating an overall configuration of an imaging device according to a fourth embodiment.

The imaging device 100B according to the fourth embodiment will be described with reference to FIG. 15. FIG. 15 is a block diagram schematically illustrating an overall configuration of the imaging device 100B according to the present embodiment.

In the first embodiment, the configuration in which the reference signal generation circuit 170, the signal processing circuit 140, and the counter 160 function as the AD conversion unit is described. In the present embodiment, instead of these, the imaging device 100B includes a pipelined AD conversion unit 144. In the present embodiment, description of elements common to those of the first embodiment may be omitted or simplified.

The AD conversion unit 144 includes a plurality of pipelined AD conversion circuits 144A (analog-to-digital conversion circuits). Each of the plurality of AD conversion circuits 144A is electrically connected to a corresponding one of the plurality of output lines 113. That is, one AD conversion circuit 144A is configured to process a pixel signal output from at least one pixel 111.

An output node of the AD conversion circuit 144A is electrically connected to a corresponding memory group 180. The AD conversion circuit 144A performs AD conversion on the pixel signal, and supplies the AD-converted pixel data to the corresponding memory in the memory group 180.

The AD conversion circuit 144A includes a switch or the like whose connection is switched according to the mode. By switching the memory from which the pixel data is output from the AD conversion circuit 144A between the first mode and the second mode, it is possible to realize the pixel data storage method as illustrated in FIGS. 4A and 4B in the same manner as in the first embodiment. That is, in the second mode, pixel data corresponding to a plurality of pixels can be stored in the memory that stores pixel data corresponding to one pixel in the first mode.

According to the present embodiment, as in the first embodiment, an imaging device and a method of driving the imaging device capable of high-speed operation are provided. In the present embodiment, the pipelined AD conversion circuit 144A is employed. The pipelined AD conversion circuit has advantages of high speed, low power consumption, and a small occupied area. Therefore, according to the present embodiment, high speed, low power consumption, and compact imaging device is realized.

Further, in a case where the imaging device according to the present embodiment is an imaging device for radiation detection, in addition to the above-described effects, the probability of radiation entering the circuit element is lowered, so that an effect of reducing radiation degradation may be obtained.

Fifth Embodiment

Figure 16:
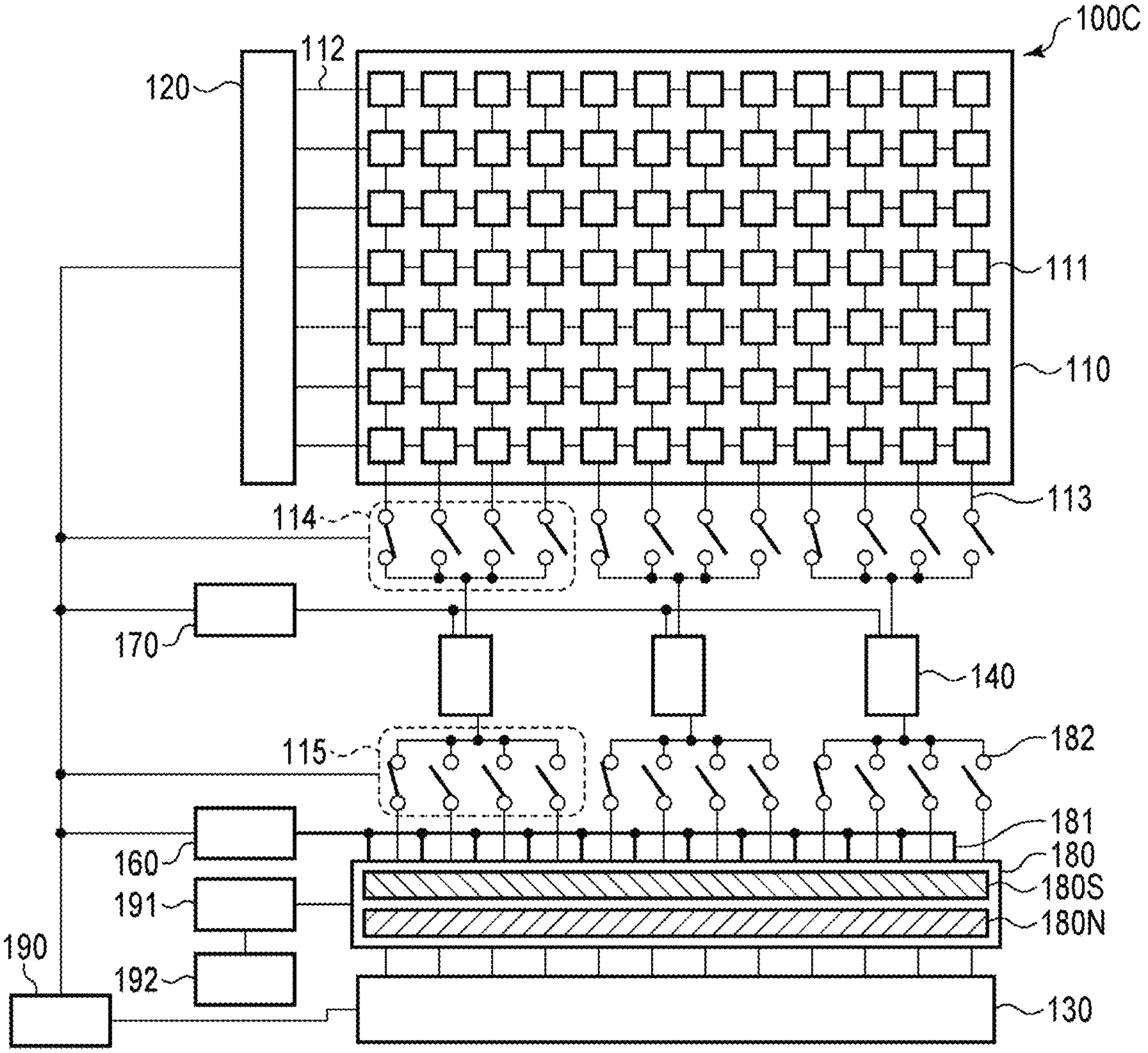
FIG. 16 is a block diagram schematically illustrating an overall configuration of an imaging device according to a fifth embodiment.

An imaging device 100C according to the fifth embodiment will be described with reference to FIG. 16. FIG. 16 is a block diagram schematically illustrating an overall configuration of the imaging device 100C according to the present embodiment. In the first embodiment, one signal processing circuit 140 is connected to one output line 113. In contrast, in the present embodiment, one signal processing circuit 140 is shared by a plurality of output lines 113. In the present embodiment, description of elements common to those of the first embodiment may be omitted or simplified.

The imaging device 100C includes a switch group 114 and a switch group 115. Each of the switch group 114 and the switch group 115 includes a plurality of switches. The plurality of switches are controlled by a control signal supplied from the timing control unit 190. The switch group 114 connects one of the plurality of output lines 113 to one signal processing circuit 140. The switch group 115 connects an output terminal of the signal processing circuit 140 to one memory of the plurality of memory groups 180.

By appropriately switching the connection between the switch group 114 and the switch group 115, the plurality of output lines 113 can share one signal processing circuit 140. Although FIG. 16 exemplifies a configuration in which four output lines 113 share one signal processing circuit 140, the number of output lines 113 sharing one signal processing circuit 140 may be other than four.

In the present embodiment, the switches in the switch group 114 are controlled to sequentially switch the output lines 113 connected to the signal processing circuit 140. The switches in the switch group 115 are controlled to sequentially switch the memories to which the signal processing circuit 140 outputs signals in synchronization with the switching of the switches in the switch group 114.

According to the present embodiment, as in the first embodiment, an imaging device and a method of driving the imaging device capable of high-speed operation are provided. Further, in the present embodiment, since the plurality of output lines 113 share one signal processing circuit 140, a ratio of the number of signal processing circuits 140 to the number of the plurality of output lines 113 can be reduced. Therefore, the area occupied by the signal processing circuit 140 is reduced. As a result, it is possible to obtain an effect of reducing the size and cost of the device by reducing the chip size.

Further, in a case where the imaging device according to the present embodiment is an imaging device for radiation detection, in addition to the above-described effects, the probability of radiation entering the circuit element is lowered, so that an effect of reducing radiation degradation may be obtained.

In the present embodiment, the configuration of the AD conversion unit may be the pipelined AD conversion circuit described in the fourth embodiment, and in that case, the same effect as in the fourth embodiment may be obtained.

Sixth Embodiment

Figure 17:
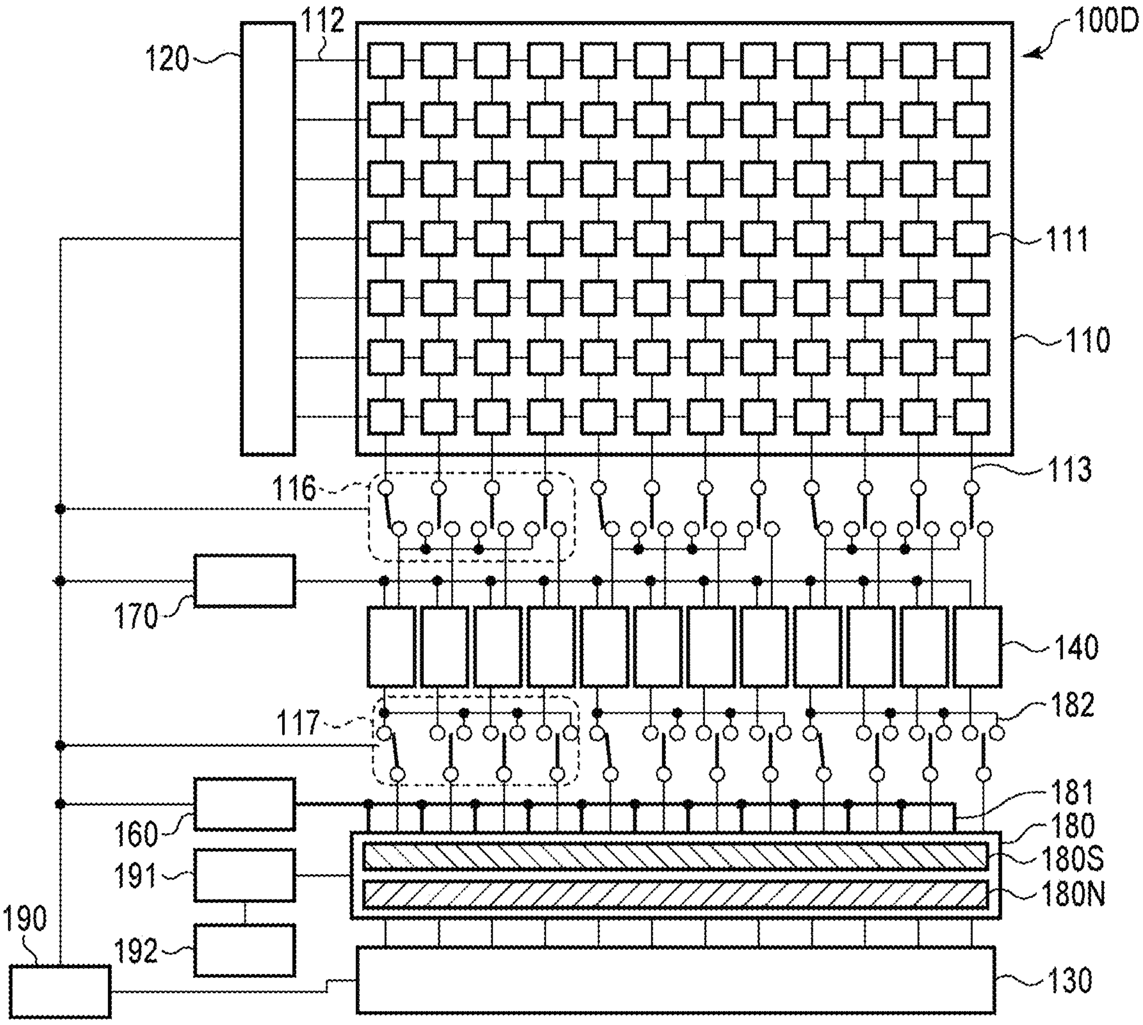
FIG. 17 is a block diagram schematically illustrating an overall configuration of an imaging device according to a sixth embodiment.

An imaging device 100D according to the sixth embodiment will be described with reference to FIG. 17. FIG. 17 is a block diagram schematically illustrating an overall configuration of the imaging device 100D according to the present embodiment. The imaging device 100D of the present embodiment can switch between the configuration described in the first embodiment and the configuration described in the fifth embodiment. That is, the imaging device 100D of the present embodiment can switch between a configuration in which each of the plurality of signal processing circuits 140 is electrically connected to a corresponding one of the plurality of output lines 113 and a configuration in which the plurality of output lines 113 share one signal processing circuit 140. In the present embodiment, description of elements common to the first embodiment or the fifth embodiment may be omitted or simplified.

The imaging device 100D includes a switch group 116 and a switch group 117. Each of the switch group 116 and the switch group 117 includes a plurality of switches and functions as a state switching unit. The plurality of switches are controlled by a control signal supplied from the timing control unit 190. The switch group 116 switches between a configuration (first state) in which each of the plurality of signal processing circuits 140 is connected to a corresponding one of the plurality of output lines 113 and a configuration (second state) in which the plurality of output lines 113 share one signal processing circuit 140. In the second state, as in the fifth embodiment, the output lines 113 connected to one shared signal processing circuit 140 are sequentially switched. The switch group 117 switches between a configuration in which each of the output terminals of the plurality of signal processing circuits 140 is connected to one corresponding memory of the plurality of memory groups 180 and a configuration in which the output terminal of the shared signal processing circuit 140 is connected to one memory of the plurality of memory groups 180. As described above, the switch group 116 and the switch group 117 have a function of switching between the state having the same configuration as that of the first embodiment and the state having the same configuration as that of the fifth embodiment.

According to the present embodiment, as in the first embodiment, an imaging device and a method of driving the imaging device capable of high-speed operation are provided. Further, the configuration in which each of the plurality of signal processing circuits 140 is electrically connected to the corresponding one of the plurality of output lines 113 as in the first embodiment and the configuration in which the plurality of output lines 113 share one signal processing circuit 140 as in the fifth embodiment can be switched. In the latter structure, power supply and operation of the unused signal processing circuit 140 can be stopped, and thus power consumption may be reduced.

Although FIG. 17 exemplifies a configuration in which four output lines 113 are set as one group and four output lines 113 included in the group share one signal processing circuit 140 in the second state, the number of output lines 113 included in the group is not limited to four.

In the present embodiment, the configuration of the AD conversion unit may be the pipelined AD conversion circuit described in the fourth embodiment, and in that case, the same effect as in the fourth embodiment can be obtained.

Seventh Embodiment

Figure 18:
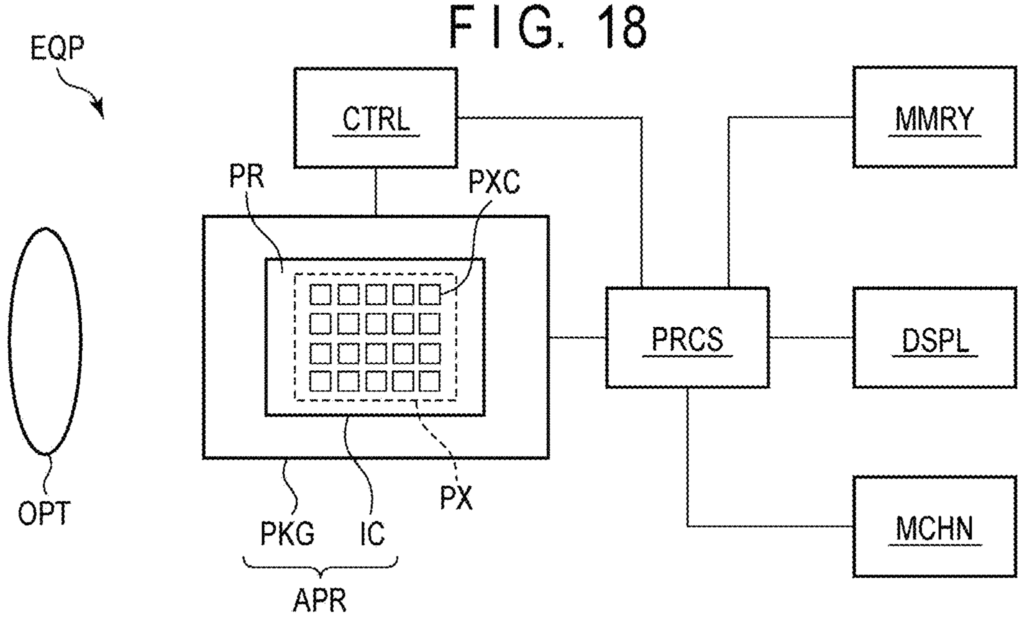
FIG. 18 is a block diagram illustrating a schematic configuration of equipment according to a seventh embodiment.

Equipment according to a seventh embodiment of the present invention will be described with reference to FIG. 18. FIG. 18 is a block diagram illustrating a schematic configuration of equipment according to the present embodiment.

FIG. 18 is a schematic diagram illustrating equipment EQP including a photoelectric conversion device APR. The photoelectric conversion device APR has the function of the imaging devices according to the first to sixth embodiments. All or part of the photoelectric conversion device APR is a semiconductor device IC. The photoelectric conversion device APR of this example can be used as, for example, an image sensor, an auto focus (AF) sensor, a photometric sensor, a ranging sensor, or the like. The semiconductor device IC has a pixel area PX in which pixel circuits PXC each including photoelectric conversion unit are arranged in a matrix. The semiconductor device IC may have a peripheral area PR around the pixel area PX. Circuits other than the pixel circuits can be arranged in the peripheral area PR.

The photoelectric conversion device APR may have a structure (stacked chips structure) in which a first semiconductor chip provided with a plurality of photoelectric conversion units and a second semiconductor chip provided with a peripheral circuit are stacked. Each of the peripheral circuits in the second semiconductor chip may be a column circuit corresponding to a pixel column of the first semiconductor chip. Each of the peripheral circuits in the second semiconductor chip may be a matrix circuit corresponding to a pixel or a pixel block in the first semiconductor chip. For the connection between the first semiconductor chip and the second semiconductor chip, a through electrode (TSV), an inter-chip wiring by direct bonding of a conductor such as copper, a connection by a micro bump between chips, a connection by wire bonding, or the like can be employed.

The photoelectric conversion device APR may include a package PKG for mounting the semiconductor device IC in addition to the semiconductor device IC. The package PKG may include a base body to which the semiconductor device IC is fixed, a lid such as glass facing the semiconductor device IC, and a connection member such as a bonding wire or a bump for connecting a terminal provided on the base body and a terminal provided on the semiconductor device IC.

The equipment EQP may further include at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR, and constitutes an analog front end (AFE) or a digital front end (DFE). The processing device PRCS is a semiconductor device such as a central processing unit (CPU) or an application specific integrated circuit (ASIC). The display device DSPL is an EL display device, a liquid crystal display device, or the like that displays information (image) obtained by the photoelectric conversion device APR. The storage device MMRY is a magnetic device, a semiconductor device, or the like that stores information (image) obtained by the photoelectric conversion device APR. The storage device MMRY is a volatile memory such as an SRAM or a DRAM, or a nonvolatile memory such as a flash memory or a hard disk drive. The mechanical device MCHN includes a movable portion or a propulsion portion such as a motor or an engine. In the equipment EQP, a signal output from the photoelectric conversion device APR is displayed on the display device DSPL or transmitted to the outside by a communication device (not illustrated) included in the equipment EQP. Therefore, it is preferable that the equipment EQP further include a storage device MMRY and a processing device PRCS separately from the storage circuit unit and the arithmetic circuit unit included in the photoelectric conversion device APR.

The equipment EQP illustrated in FIG. 17 may be an electronic device such as an information terminal (for example, a smartphone and a wearable terminal) having a photographing function, a camera (For example, an interchangeable lens camera, a compact camera, a video camera, and a surveillance camera), or the like. The mechanical device MCHN in the camera may drive parts of the optical device OPT for zooming, focusing, and shutter operation. Also, the equipment EQP may be a transport device (movable body) such as a vehicle, a ship, or a flying object. The equipment EQP may be a medical device such as an endoscope or a CT scanner.

The mechanical device MCHN in the transport device may be used as a movable device. The equipment EQP as a transport device is suitable for transporting the photoelectric conversion device APR, or for assisting and/or automating driving (manipulation) by an imaging function. The processing device PRCS for assisting and/or automating driving (manipulation) may perform processing for operating the mechanical device MCHN as a movable device based on information obtained by the photoelectric conversion device APR.

The photoelectric conversion device APR according to the present embodiment may provide a high value to a designer, a manufacturer, a seller, a purchaser, and/or a user thereof. Therefore, when the photoelectric conversion device APR is mounted on the equipment EQP, the value of the equipment EQP may also be increased.

Therefore, in manufacturing and selling the equipment EQP, it is advantageous to determine the mounting of the photoelectric conversion device APR of the present embodiment on the equipment EQP in order to increase the value of the equipment EQP.

Eighth Embodiment

Figure 19A:
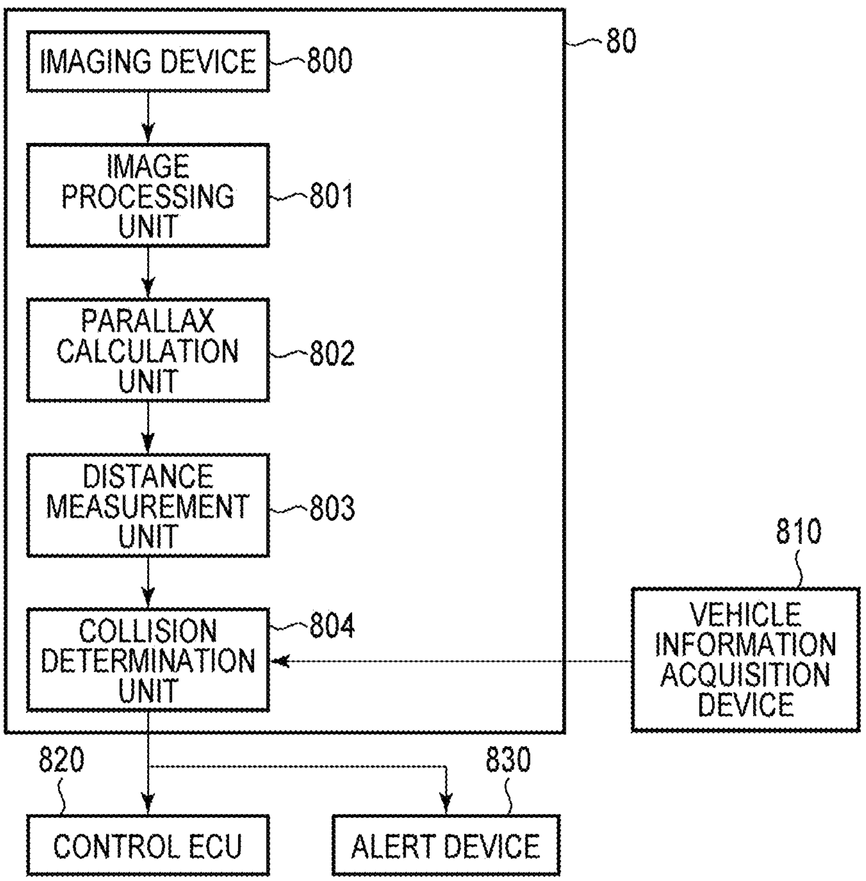
FIGS. 19A and 19B are block diagrams illustrating a schematic configuration of equipment according to an eighth embodiment.
Figure 19B:
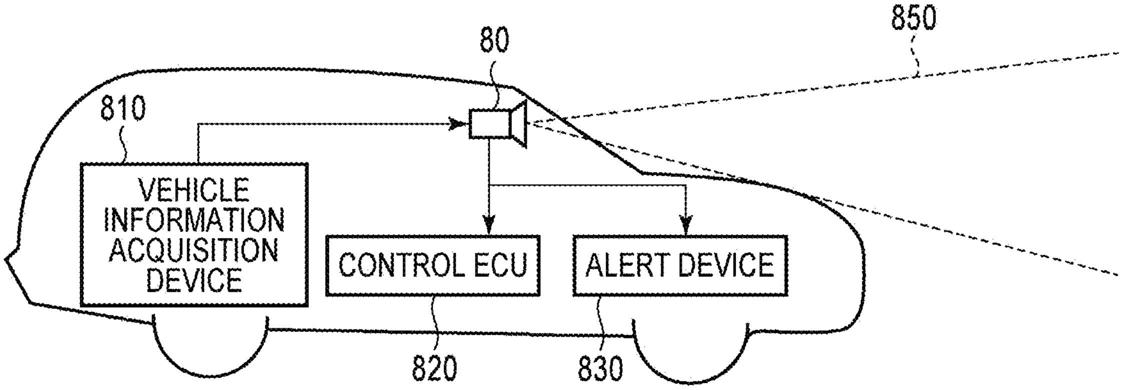

FIGS. 19A and 19B are block diagrams of equipment relating to the vehicle-mounted camera according to the present embodiment. FIGS. 19A and 19B illustrate an example in which the above-described imaging device is applied to a movable body such as a vehicle. The equipment 80 includes an imaging device 800 and a signal processing device (processing device) that processes a signal from the imaging device 800. The equipment 80 includes an image processing unit 801 that performs image processing on a plurality of pieces of image data acquired by the imaging device 800, and a parallax calculation unit 802 that calculates parallax (phase difference of parallax images) from the plurality of pieces of image data acquired by the equipment 80. The equipment 80 includes a distance measurement unit 803 that calculates a distance to an object based on the calculated parallax, and a collision determination unit 804 that determines whether or not there is a possibility of collision based on the calculated distance. Here, the parallax calculation unit 802 and the distance measurement unit 803 are examples of a distance information acquisition unit that acquires distance information to the object. That is, the distance information is information on a parallax, a defocus amount, a distance to the object, and the like. The collision determination unit 804 may determine the possibility of collision using any of these pieces of distance information. The distance information acquisition unit may be realized by dedicatedly designed hardware or software modules. Further, it may be realized by a field programmable gate array (FPGA), an application specific integrated circuit (ASIC) or a combination thereof.

The equipment 80 is connected to the vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm such as a sound, displaying alert information on a screen of a car navigation system or the like, or giving vibration to a seat belt or a steering wheel. The equipment 80 functions as a control unit that controls the operation of controlling the vehicle as described above.

In the present embodiment, an image of the periphery of the vehicle, for example, the front or the rear is captured by the equipment 80. FIG. 19B illustrates equipment in a case where an image is captured in front of the vehicle (image capturing range 850). The vehicle information acquisition device 810 as the imaging control unit sends an instruction to the equipment 80 or the imaging device 800 to perform the imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiments, and various modifications are possible. For example, an example in which some of the configurations of any one of the embodiments are added to other embodiments or an example in which some of the configurations of any one of the embodiments are replaced with some of the configurations of other embodiments are also embodiments of the present invention.

The structure of the above-described imaging device is not limited to a specific form. For example, the element structure of the imaging device may be either a front-side illumination type or a back-side illumination type. In addition, the imaging device may be a stacked type in which a semiconductor chip including a pixel array and a semiconductor chip including a signal processing circuit are stacked.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It should be noted that the above-described embodiments are merely specific examples for carrying out the present invention, and the technical scope of the present invention should not be interpreted in a limited manner by these embodiments. That is, the present invention can be implemented in various forms without departing from the technical idea or the main features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-016925, filed Feb. 7, 2024, which is hereby incorporated by reference herein in its entirety.

What is claimed is:

1. An imaging device comprising:
- a plurality of pixels each configured to output a pixel signal;
- a first output line and a second output line each connected to a corresponding pixel;
- an analog-to-digital conversion unit configured to perform analog-to-digital conversion on the pixel signal to generate pixel data;
- a first memory and a second memory each configured to hold the pixel data; and
- a scanning circuit configured to perform scanning for causing the first memory and the second memory to output the pixel data,
- wherein in a first mode,
- the analog-to-digital conversion unit performs analog-to-digital conversion on a pixel signal from the first output line to generate first pixel data and performs analog-to-digital conversion on a pixel signal from the second output line to generate second pixel data,
- the first memory stores the first pixel data,
- the second memory stores the second pixel data, and
- the scanning circuit causes the first memory to output the first pixel data and causes the second memory to output the second pixel data, and
- wherein in a second mode,
- the analog-to-digital conversion unit performs analog-to-digital conversion on a pixel signal from the first output line to generate third pixel data and performs analog-to-digital conversion on a pixel signal from the second output line to generate fourth pixel data,
- the first memory stores the third pixel data and the fourth pixel data, and
- the scanning circuit causes the first memory to output the third pixel data and the fourth pixel data,
- wherein the plurality of pixels are arranged to form a plurality of rows and a plurality of columns, and wherein a time required to output pixel data corresponding to a plurality of pixels in one row in the second mode is shorter than a time required to output pixel data corresponding to the plurality of pixels in the one row in the first mode.

2. The imaging device according to claim 1,
wherein the first memory has a storage capacity of k bits (k is an integer of two or more),
wherein each of the first pixel data and the second pixel data is digital data of m bits (m is an integer of two or more and k or less), and
wherein each of the third pixel data and the fourth pixel data is digital data of n bits (n is an integer of one or more and m/2 or less).

3. The imaging device according to claim 1,
wherein the first memory includes a first memory area having a storage capacity of i bits (i is an integer of two or more) and a second memory area having a storage capacity of j bits (j is an integer of two or more),
wherein the first pixel data includes first light data generated based on charges generated by photoelectric conversion and first noise data generated based on a signal output from a pixel in a reset state,
wherein the third pixel data includes third light data generated based on charges generated by photoelectric conversion,
wherein the fourth pixel data includes fourth light data generated based on charges generated by photoelectric conversion,
wherein in the first mode, the first memory area stores the first light data of p bits (p is an integer of two or more and i or less), and the second memory area stores the first noise data of q bits (q is an integer of one or more and j or less), and
wherein in the second mode, the first memory area and the second memory area store the third light data of r bits (r is an integer of one or more, p/2 or less, and q or less) and the fourth light data of r bits.

4. The imaging device according to claim 1, wherein in the second mode, the second memory stores dummy data of a fixed value.

5. The imaging device according to claim 1, wherein each of the third pixel data and the fourth pixel data is 1-bit digital data.

6. The imaging device according to claim 1,
wherein the analog-to-digital conversion unit includes a comparator and a counter,
wherein the comparator compares a potential of the first output line or the second output line with a potential of a reference signal, and
the counter outputs, to the first memory or the second memory, a signal corresponding to a time when an output signal of the comparator changes.

7. The imaging device according to claim 1, wherein the analog-to-digital conversion unit includes a pipelined analog-to-digital conversion circuit.

8. The imaging device according to claim 1,
wherein the plurality of pixels are arranged to form a plurality of columns,
wherein the first output line is connected to pixels in one of the plurality of columns, and
wherein the second output line is connected to pixels in another one of the plurality of columns.

9. The imaging device according to claim 8,
wherein the analog-to-digital conversion unit includes a plurality of processing circuits each having an analog-to-digital conversion function, and
wherein the plurality of processing circuits are arranged so as to respectively correspond to the plurality of columns.

10. The imaging device according to claim 8,
wherein the analog-to-digital conversion unit includes a plurality of processing circuits each having an analog-to-digital conversion function, and
wherein one of the plurality of processing circuits is arranged so as to correspond to two or more of the plurality of columns.

11. The imaging device according to claim 8 further comprising a state switching unit,
wherein the analog-to-digital conversion unit includes a plurality of processing circuits each having an analog-to-digital conversion function, and
wherein the state switching unit switches between a first state in which the plurality of processing circuits are arranged so as to respectively correspond to the plurality of columns and a second state in which one of the plurality of processing circuits is arranged so as to correspond to two or more of the plurality of columns.

12. The imaging device according to claim 1, wherein each of the plurality of pixels is sensitive to radiation.

13. The imaging device according to claim 1, wherein in the second mode, the scanning circuit causes the first memory to simultaneously output the third pixel data and the fourth pixel data.

14. The imaging device according to claim 1, wherein in the second mode, the scanning circuit does not cause the second memory to output a signal.

15. The imaging device according to claim 1 further comprising a mode switching unit configured to switch between the first mode and the second mode by switching an output destination of a signal from the analog-to-digital conversion unit to one of the first memory and the second memory.

16. Equipment comprising:
the imaging device according to claim 1; and
at least any one of:
an optical device adapted for the imaging device,
a control device configured to control the imaging device,
a processing device configured to process a signal output from the imaging device,
a display device configured to display information obtained by the imaging device,
a storage device configured to store information obtained by the imaging device, and
a mechanical device configured to operate based on information obtained by the imaging device.

17. The equipment according to claim 16, wherein the processing device acquires distance information on a distance from the imaging device to an object.

18. An imaging device comprising:
a plurality of pixels each configured to output a pixel signal;
a first output line and a second output line each connected to a corresponding pixel;
an analog-to-digital conversion unit configured to perform analog-to-digital conversion on the pixel signal to generate pixel data;
a first memory and a second memory each configured to hold the pixel data; and
a scanning circuit configured to perform scanning for causing the first memory and the second memory to output the pixel data,
wherein in a first mode, the analog-to-digital conversion unit performs analog-to-digital conversion on a pixel signal from the first output line to generate first pixel data and performs analog-to-digital conversion on a pixel signal from the second output line to generate second pixel data, the first memory stores the first pixel data, the second memory stores the second pixel data, and the scanning circuit causes the first memory to output the first pixel data and causes the second memory to output the second pixel data, wherein in a second mode, the analog-to-digital conversion unit performs analog-to-digital conversion on a pixel signal from the first output line to generate third pixel data and performs analog-to-digital conversion on a pixel signal from the second output line to generate fourth pixel data, the first memory stores the third pixel data and the fourth pixel data, and the scanning circuit causes the first memory to output the third pixel data and the fourth pixel data, wherein the first memory includes a first memory area having a storage capacity of i bits (i is an integer of two or more) and a second memory area having a storage capacity of j bits (j is an integer of two or more), wherein the first pixel data includes first light data generated based on charges generated by photoelectric conversion and first noise data generated based on a signal output from a pixel in a reset state, wherein the third pixel data includes third light data generated based on charges generated by photoelectric conversion, wherein the fourth pixel data includes fourth light data generated based on charges generated by photoelectric conversion, wherein in the first mode, the first memory area stores the first light data of p bits (p is an integer of two or more and i or less), and the second memory area stores the first noise data of q bits (q is an integer of one or more and j or less), and wherein in the second mode, the first memory area and the second memory area store the third light data of r bits (r is an integer of one or more, p/2 or less, and q or less) and the fourth light data of r bits.

19. Equipment comprising:

the imaging device according to claim 18; and at least any one of:

an optical device adapted for the imaging device, a control device configured to control the imaging device, a processing device configured to process a signal output from the imaging device, a display device configured to display information obtained by the imaging device, a storage device configured to store information obtained by the imaging device, and a mechanical device configured to operate based on information obtained by the imaging device.

20. The equipment according to claim 19, wherein the processing device acquires distance information on a distance from the imaging device to an object.

* * * * *